(12) United States Patent
Uno

(10) Patent No.: US 9,087,445 B2
(45) Date of Patent: Jul. 21, 2015

(54) VEHICULAR INFORMATION-PROCESSING DEVICE AND VEHICULAR INFORMATION-PROCESSING METHOD

(75) Inventor: Satoshi Uno, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 45 days.

(21) Appl. No.: 14/007,545

(22) PCT Filed: Aug. 29, 2011

(86) PCT No.: PCT/JP2011/069455
§ 371 (c)(1),
(2), (4) Date: Sep. 25, 2013

(87) PCT Pub. No.: WO2013/030927
PCT Pub. Date: Mar. 7, 2013

(65) Prior Publication Data
US 2014/0015663 A1  Jan. 16, 2014

(51) Int. Cl.
*B60W 40/12* (2012.01)
*G08B 21/02* (2006.01)
(Continued)

(52) U.S. Cl.
CPC ............ *G08B 21/02* (2013.01); *B60R 16/0236* (2013.01); *B60W 40/08* (2013.01)

(58) Field of Classification Search
CPC .................................................. B60R 16/0236
USPC ..................................... 340/439, 576; 701/22
See application file for complete search history.

(56) References Cited

U.S. PATENT DOCUMENTS

| | | | |
|---|---|---|---|
| 8,686,845 B2* | 4/2014 | Pilutti et al. | 340/441 |
| 2008/0243312 A1* | 10/2008 | Nakamura et al. | 701/1 |
| 2008/0306686 A1 | 12/2008 | Nakayama | |

(Continued)

FOREIGN PATENT DOCUMENTS

| | | |
|---|---|---|
| JP | 5 58200 | 3/1993 |
| JP | 2007 221889 | 8/2007 |

(Continued)

OTHER PUBLICATIONS

International Search Report Issued Oct. 18, 2011 in PCT/JP11/69455 filed Aug. 29, 2011.
Japanese Office Action issued Jun. 3, 2014, in Japan Patent Application No. 2013-530910.

*Primary Examiner* — Brent Swarthout
(74) *Attorney, Agent, or Firm* — Oblon, McClelland, Maier & Neustadt, L.L.P.

(57) ABSTRACT

A vehicular information-processing device and a vehicular information-processing method with which driver operation information can be smoothly linked to learning results are provided. The information-processing ECU learns pieces of operation information, which are obtained in correspondence with various vehicle operations by a driver, in association with the respective spots where the vehicle operations occurred, and, on the basis of the result of learning, provides operation information specific to each spot as driving assistance information. The information-processing ECU determines whether or not the specific operation information provided at the same spot conforms to the driver's vehicle operation at the spot, and learns the repeatability of the specific operation information provided at the spot on the basis of the number of times that it is determined that there is conformity or the number of times that it is determined there is no conformity.

10 Claims, 10 Drawing Sheets

(51) Int. Cl.
*B60R 16/023* (2006.01)
*B60W 40/08* (2012.01)

(56) References Cited

U.S. PATENT DOCUMENTS

2011/0172864 A1* 7/2011 Syed et al. ............... 701/22
2014/0142797 A1* 5/2014 Otake ....................... 701/22

FOREIGN PATENT DOCUMENTS

| JP | 2008 146332 | 6/2008 |
| JP | 2008-304251 | 12/2008 |
| JP | 2009 177956 | 8/2009 |
| JP | 2010 202042 | 9/2010 |

* cited by examiner

Fig.9

| | | \multicolumn{11}{c|}{assistance success number} | | | | | | | | | | |
|---|---|---|---|---|---|---|---|---|---|---|---|
| | | 0 | 1 | 2 | 3 | 4 | 5 | 6 | 7 | 8 | 9 | 10 |
| estimation number | 1 | 0% | 100% | | | | | | | | | |
| | 2 | 0% | 50% | 100% | | | | | | | | |
| | 3 | 0% | 33% | 67% | 100% | | | | | | | |
| | 4 | 0% | 25% | 50% | 75% | 100% | | | | | | |
| | 5 | 0% | 20% | 40% | 60% | 80% | 100% | | | | | |
| | 6 | 0% | 17% | 33% | 50% | 67% | 83% | 100% | | | | |
| | 7 | 0% | 14% | 29% | 43% | 57% | 71% | 86% | 100% | | | |
| | 8 | 0% | 13% | 25% | 38% | 50% | 63% | 75% | 88% | 100% | | |
| | 9 | 0% | 11% | 22% | 33% | 44% | 56% | 67% | 78% | 88% | 100% | |
| | 10 | 0% | 10% | 20% | 30% | 40% | 50% | 60% | 70% | 80% | 90% | 100% |

~71 side A ← | → side B

Fig.10

| | | \multicolumn{11}{c|}{assistance success number} | | | | | | | | | | |
|---|---|---|---|---|---|---|---|---|---|---|---|
| | | 0 | 1 | 2 | 3 | 4 | 5 | 6 | 7 | 8 | 9 | 10 |
| estimation number | 1 | 4 | 1 | | | | | | | | | |
| | 2 | 8 | 3 | 1 | | | | | | | | |
| | 3 | 12 | 7 | 2 | 1 | | | | | | | |
| | 4 | 16 | 11 | 6 | 1 | 2 | | | | | | |
| | 5 | 20 | 15 | 10 | 5 | 1 | 2 | | | | | |
| | 6 | 24 | 19 | 14 | 9 | 4 | 1 | 2 | | | | |
| | 7 | 28 | 23 | 18 | 13 | 8 | 3 | 1 | 2 | | | |
| | 8 | 32 | 27 | 22 | 17 | 12 | 7 | 2 | 1 | 3 | | |
| | 9 | 36 | 31 | 26 | 21 | 16 | 11 | 6 | 1 | 2 | 3 | |
| | 10 | 40 | 35 | 30 | 25 | 20 | 15 | 10 | 5 | 1 | 2 | 3 |

~72 side A ← | → side B

Fig.11 pattern of 80%/ten times　　73

| pattern | 1 2 3 4 5 6 7 8 9 10 [th] | successive number of assistance success |
|---|---|---|
| 1 | × × ○ ○ ○ ○ ○ ○ ○ ○ | → 8 successive times |
| 2 | × ○ × ○ ○ ○ ○ ○ ○ ○ | → 7 successive times |
| 3 | × ○ ○ × ○ ○ ○ ○ ○ ○ | → 6 successive times |
| 4 | × ○ ○ ○ × ○ ○ ○ ○ ○ | → 5 successive times |
| 5 | × ○ ○ ○ ○ × ○ ○ ○ ○ | → 4 successive times |
| 6 | × ○ ○ ○ ○ ○ × ○ ○ ○ | → 5 successive times |
| 7 | × ○ ○ ○ ○ ○ ○ × ○ ○ | → 6 successive times |
| 8 | × ○ ○ ○ ○ ○ ○ ○ × ○ | → 7 successive times |
| 9 | × ○ ○ ○ ○ ○ ○ ○ ○ × | → 8 successive times |
| 10 | ○ × × ○ ○ ○ ○ ○ ○ ○ | → 7 successive times |
| 11 | ○ × ○ × ○ ○ ○ ○ ○ ○ | → 6 successive times |
| 12 | ○ × ○ ○ × ○ ○ ○ ○ ○ | → 5 successive times |
| 13 | ○ × ○ ○ ○ × ○ ○ ○ ○ | → 4 successive times |
| 14 | ○ × ○ ○ ○ ○ × ○ ○ ○ | → 4 successive times |
| 15 | ○ × ○ ○ ○ ○ ○ × ○ ○ | → 5 successive times |
| 16 | ○ × ○ ○ ○ ○ ○ ○ × ○ | → 6 successive times |
| 17 | ○ × ○ ○ ○ ○ ○ ○ ○ × | → 7 successive times |
| 18 | ○ ○ × × ○ ○ ○ ○ ○ ○ | → 6 successive times |
| 19 | ○ ○ × ○ × ○ ○ ○ ○ ○ | → 5 successive times |
| 20 | ○ ○ × ○ ○ × ○ ○ ○ ○ | → 4 successive times |
| 21 | ○ ○ × ○ ○ ○ × ○ ○ ○ | → 3 successive times |
| 22 | ○ ○ × ○ ○ ○ ○ × ○ ○ | → 4 successive times |
| 23 | ○ ○ × ○ ○ ○ ○ ○ × ○ | → 5 successive times |
| 24 | ○ ○ × ○ ○ ○ ○ ○ ○ × | → 6 successive times |
| 25 | ○ ○ ○ × × ○ ○ ○ ○ ○ | → 5 successive times |
| 26 | ○ ○ ○ × ○ × ○ ○ ○ ○ | → 4 successive times |
| 27 | ○ ○ ○ × ○ ○ × ○ ○ ○ | → 3 successive times |
| 28 | ○ ○ ○ × ○ ○ ○ × ○ ○ | → 3 successive times |
| 29 | ○ ○ ○ × ○ ○ ○ ○ × ○ | → 4 successive times |
| 30 | ○ ○ ○ × ○ ○ ○ ○ ○ × | → 5 successive times |
| 31 | ○ ○ ○ ○ × × ○ ○ ○ ○ | → 4 successive times |
| 32 | ○ ○ ○ ○ × ○ × ○ ○ ○ | → 4 successive times |
| 33 | ○ ○ ○ ○ × ○ ○ × ○ ○ | → 4 successive times |
| 34 | ○ ○ ○ ○ × ○ ○ ○ × ○ | → 4 successive times |
| 35 | ○ ○ ○ ○ × ○ ○ ○ ○ × | → 4 successive times |
| 36 | ○ ○ ○ ○ ○ × × ○ ○ ○ | → 5 successive times |
| 37 | ○ ○ ○ ○ ○ × ○ × ○ ○ | → 5 successive times |
| 38 | ○ ○ ○ ○ ○ × ○ ○ × ○ | → 5 successive times |
| 39 | ○ ○ ○ ○ ○ × ○ ○ ○ × | → 5 successive times |
| 40 | ○ ○ ○ ○ ○ ○ × × ○ ○ | → 6 successive times |
| 41 | ○ ○ ○ ○ ○ ○ × ○ × ○ | → 6 successive times |
| 42 | ○ ○ ○ ○ ○ ○ × ○ ○ × | → 6 successive times |
| 43 | ○ ○ ○ ○ ○ ○ ○ × × ○ | → 7 successive times |
| 44 | ○ ○ ○ ○ ○ ○ ○ × ○ × | → 7 successive times |
| 45 | ○ ○ ○ ○ ○ ○ ○ ○ × × | → 8 successive times | legend
○ assistance succeeded
× assistance failed

List of successive number of "assistance successes" in patterns  /74

```
8 successive times → 3 patterns (maximum)
7 successive times → 6 patterns
6 successive times → 9 patterns
5 successive times → 12 patterns (most frequent)
4 successive times → 12 patterns (most frequent)
3 successive times → 3 patterns (minimum)
```

VEHICULAR INFORMATION-PROCESSING DEVICE AND VEHICULAR INFORMATION-PROCESSING METHOD

FIELD OF THE DISCLOSURE

The present invention relates to a vehicular information-processing device and a vehicular information-processing method that process operation information obtained based on a vehicle operation that a driver performs.

BACKGROUND OF THE DISLCOSURE

A technique in which a driver's vehicle operation is learned and its result is variously used for the vehicle is known. Patent document 1 describes an example of a device that uses such a technique.

The device described in patent document 1 is incorporated in a vehicle. The device includes running characteristic control means capable of controlling a running characteristic by adjusting a control gain, a main computer capable of changing the control gain based on the result of learning the running state of the vehicle, and a position calculating computer unit that calculates the position of the vehicle. The main computer unit learns land contours and driver's vehicle operations according to the position of the vehicle, thereby obtaining from a program memory a learning program used to alter the control gain to a gain corresponding to the position of the vehicle. Based on the learning program thus obtained, the main computer unit alters the control gain, which has been set by the running characteristic control means, to a control gain corresponding to the position of the vehicle incorporating this device. Thereby the main computer unit controls the running characteristic of the vehicle. Thus, even when the vehicle runs in any area, a running characteristic corresponding to that area is imparted to the vehicle, and the imparted running characteristic conforms to the driver's intention.

PRIOR ART DOCUMENT

Patent Document
Patent Document 1: Japanese Laid-Open Patent Publication No. 5-58200

SUMMARY OF THE INVENTION

Problems that the Invention is to Solve

The device described in patent document 1 calculates the average value of operation statuses obtained by running a particular position ten or fifty times and, thereby, learns a driver's operation corresponding to the specific position. Therefore, as the population parameter when calculating the average value increases, a learning result closer to the driver's taste in driving (i.e., the intention of the driver) can be obtained. If the population parameter increases as described above, there will also be a significant increase in the time taken to process the learning. Particularly, in recent years, it has been contemplated, for example, that a learning result relating to a driver's vehicle operation is utilized for driving assistance. Therefore, interest is growing in the technique for reducing time taken to correct the content of learning while maintaining learning accuracy.

Accordingly, it is an objective of the invention to provide a vehicular information-processing device and a vehicular information-processing method that are capable of smoothly correlating driver's operation information with a learning result more.

Means for Solving the Problems

Means for solving foregoing problems and the operation effect thereof will be described below.

To achieve the foregoing objective, the present invention provides a vehicular information-processing device that learns operation information, which is obtained according to various driver's vehicle operations, to correlate the operation information with spots at which the corresponding vehicle operations have been performed, and provides, as driving assistance information, the operation information specific to the spot based on a result of the learning. The processing device determines whether particular operation information provided at a single spot conforms to the driver's vehicle operation at the spot or not. The processing device learns repeatability of the particular operation information provided at the spot based on the number of times that a determination is made that there is conformity or the number of times that a determination is made that there is no conformity.

To achieve the foregoing objective, the present invention also provides a vehicular information-processing method includes: learning operation information, which is obtained according to various driver's vehicle operations, to correlate the operation information with spots at which the corresponding vehicle operations have been performed; and providing, as driving assistance information, the operation information specific to the spot based on a result of the learning. The processing method also includes: determining whether particular operation information provided at a single spot conforms to the driver's vehicle operation at the spot or not; and learning repeatability of the particular operation information provided at the spot based on the number of times that a determination is made that there is conformity or the number of times that a determination is made that there is no conformity.

According to such a configuration or method, the driver's taste in driving, herein referred to as repeatability, can be learned based on the number of times that a determination is made that particular operation information provided as driving assistance information conforms to a driver's vehicle operation or that this number is not suitable for the vehicle operation. That is, in this device, since repeatability is learned based on the determined number of times, repeatability can be determined fairly easily. Therefore, driver's operation information can be correlated with the learning result of the repeatability more smoothly.

For example, the number of determinations counted from the beginning point of learning increases only and never decreases. Therefore, a stable determination result can be expected. As a result, driver's operation information can be more smoothly correlated with a learning result.

According to a preferable configuration, the determination whether or not there is conformity is made based on whether a difference between the operation information specific to the spot provided in the driving assisting information and the result of the driver's vehicle operation falls within an acceptable error range or not.

According to a preferable method, the determining includes determining whether or not there is conformity based on whether a difference between the operation information specific to the spot provided in the driving assisting information and the result of the driver' vehicle operation falls within an acceptable error range or not.

In such a configuration or method, whether spot-specific operation information conforms to a driver's vehicle operation or not is determined based on whether the difference between the spot-specific operation information, which is provided in driving assistance information, and the result of a driver's vehicle operation falls within an acceptable error range. Accordingly, by appropriately setting the acceptable error range, driving operation assistance can be provided without discomforting the driver.

According to a preferable configuration, the result of the vehicle operation is movement result of the vehicle.

According to a preferable method, the result of the vehicle operation is movement result of the vehicle.

In such a configuration or method, movement of the vehicle is regarded as the result of a driver's vehicle operation. Accordingly, based on movement of the vehicle, which is a driver's vehicle operation, whether driving assistance information is appropriate for the driver's vehicle operation or not can be determined. For example, in a determination whether driving assistance information is appropriate based on pedal operation among a driver's vehicle operations, there may be a possibility that, even though the movement of the vehicle is suitable, the driving assistance information is not appropriate if there is no driver's pedal operation used as a reference for a determination of conformity. To solve the foregoing problem, the device determines, based on the movement of the vehicle, whether driving assistance information is appropriate or not. Thereby, even if the driver's pedal operation is not detected by a sensor or the like, whether the driving assistance information conforms to or not can be appropriately determined. Thus, repeatability of vehicle operation relating to spot-specific operation information can be appropriately determined.

According to a preferable configuration, the acceptable error is set for each driver.

According to a preferable method, the acceptable error is set for each driver.

According to such a configuration or method, an acceptable error is set for each driver. Therefore, an acceptable error can be used to reflect vehicle operation differences between drivers. By virtue of this, a driver can be provided with driving assistance information based on an acceptable error corresponding to that driver. Accordingly, any risk of discomforting the driver due to the driving assistance information decreases.

According to a preferable configuration, the number of times that a determination is made that there is conformity or the number of times that a determination is made that there is no conformity is the number of times that the same type of determination is made consecutively.

According to a preferable method, the determining uses the number of times that the same type of determination is made consecutively, and the number of times refers to the number of times that a determination is made that there is conformity or the number of times that a determination is made that there is no conformity.

According to such a configuration or method, since repeatability is determined based on the successive number of times, the influence of superfluous long-past passage operation history on the determination of the successive number of times is eliminated or reduced. Accordingly, any change in the driver's taste in vehicle operation can be recognized at an early stage.

According to a preferable configuration, if the spot is a location where the particular vehicle operation is requested, the number of times that the same type of determination is made consecutively is changed.

A preferable method further includes changing the number of times that the same type of determination is made consecutively when the spot is a location where the particular vehicle operation is requested.

According to such a configuration or method, in a case where the same type of vehicle operation as a vehicle operation required in a location where a particular vehicle operation is required is learned, the successive number of times used to learn the repeatability of the operation information is changed. For example, in a location where a temporary stop is required, a driver is requested to perform a deceleration operation (stopping operation may be included) as a specific vehicle operation. Accordingly, the number of times that the same type of determination used for learning the repeatability of a deceleration operation can be reduced.

According to a preferable configuration, the spot is set as a spot defined by a predetermined range that includes the spot when the operation information was obtained at the spot for the first time.

A preferable method further includes setting, prior to the determining, the spot as a spot defined by a predetermined range that includes the spot when the operation information was obtained at this spot for the first time.

According to such a configuration or method, since a spot is set based on operation information, the flexibility of setting a spot in which driving assistance is learned can be improved. Additionally, a spot in which such learning is carried out is set as a spot of a predetermined range that includes a spot in which operation information has been obtained. Accordingly, it is possible to suitably cope with, for example, vehicle displacement due to road conditions or displacement due to a degree of inaccuracy in position detection. Also, a predetermined range is used as the identical spot. Therefore, many spots where repeatability is learned are prevented from being set over a range in which these spots are close to one another. Accordingly, information increase is also restricted.

BRIEF DESCRIPTION OF THE DRAWINGS

FIG. 9 is a graph illustrating the continuation determining process for driving assistance shown in FIG. 7;

FIG. 10 is a graph illustrating the continuation determining process for driving assistance shown in FIG. 7;

FIG. 11 is a graph illustrating the continuation determining process for driving assistance shown in FIG. 7;

FIG. 13 is a diagram illustrating the transition of learning by the vehicular information-processing device shown in FIG. 1, in which section (a) is a chart conceptually illustrating a state in which learning initiates or terminates, section (b) is a chart conceptually illustrating a state in which learning is taking place, and section (c) is a chart conceptually illustrating a state in which learning has been terminated.

DETAILED DESCRIPTION OF PREFERRED EMBODIMENTS

A vehicular information-processing device according to one embodiment of the present invention will be described below with reference to FIG. 1.

Figure 1:
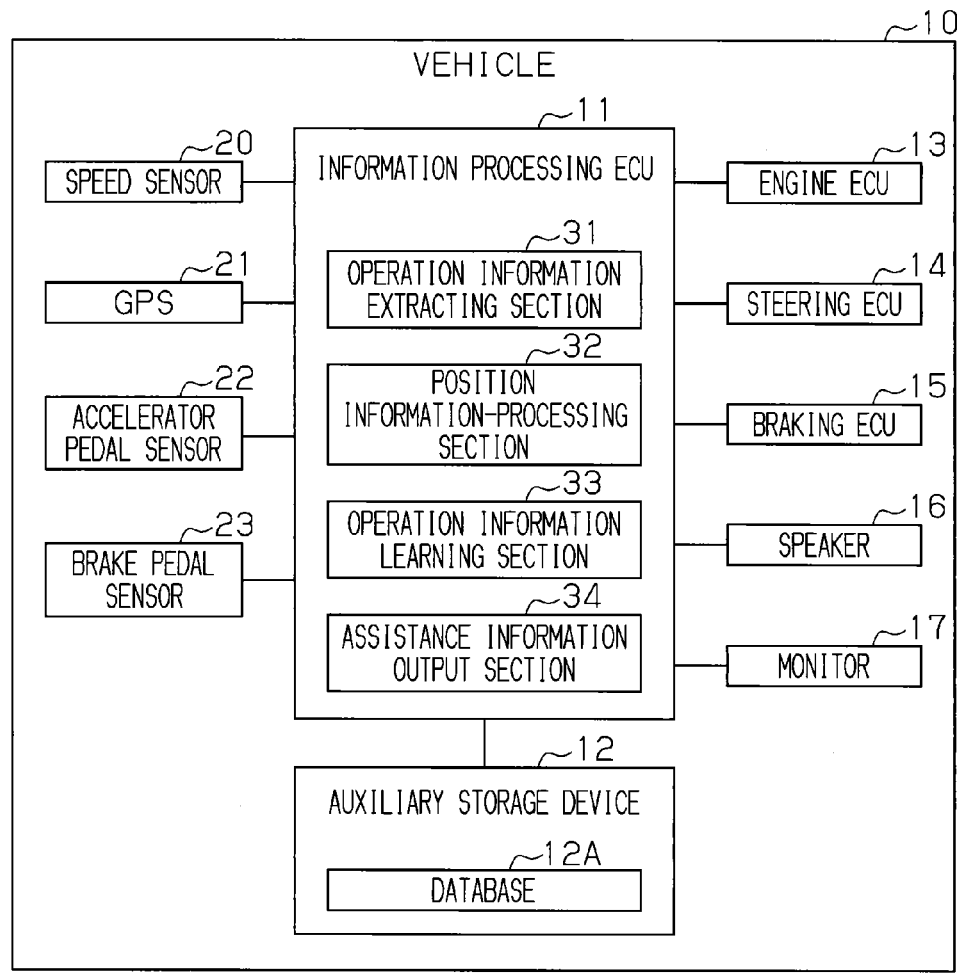
FIG. 1 is a block diagram of a schematic configuration of a vehicular information-processing device according to one embodiment of the present invention.

As shown in FIG. 1, a vehicle 10 is equipped with an information-processing electronic control unit (information-processing ECU) 11 serving as a vehicular information-processing device and an auxiliary storage device 12 connected to the information-processing ECU 11 to be able to communicate with the ECU 11. Also, the vehicle 10 is equipped with an engine electronic control unit (engine ECU) 13, a steering electronic control unit (steering ECU) 14, and a brake electronic control unit (braking ECU) 15, each of which is connected to the information-processing ECU 11 to be able to communicate with the ECU 11.

The auxiliary storage device 12 includes a hard disk drive (HDD) or the like, which is a nonvolatile storage device. The auxiliary storage device 12 is provided with a database 12A. Various items of information used for information-processing by the information-processing ECU 11 are registered in the database 12A. For example, "operation information," and "learning area" are registered in the database 12A to be correlated with each other. "The operation information" is information registered based on vehicle operation performed by a driver and the "learning area" is information registered in terms of a predetermined range including the location where vehicle operation is performed. Additionally, various items of information relating to driving assistance associated with the "learning area" are stored in the database 12A. Examples of such items of information include information about vehicle operation contributing to the content of assistance, the number of times that the vehicle has passed through, vehicle movement during passage, or failure or success of a given driving assistance. Furthermore, information used for various determinations, information used for learning, and other such information is registered in the database 12A. These items of information may be registered per vehicle or per individual driver in the database 12A.

Additionally, "specific location information" is registered together with "specific operation information" in the database 12A. The "specific location information" is about locations where stopping operation or deceleration operation is required by a driver for a temporary stop, a railroad crossing, an intersection inhibiting right turn, or a sharp curve. The "specific operation information" is about vehicle operation such as a "stopping operation" or a "deceleration operation" required at the location of "a deceleration target area." Information about a specific location where a "stopping operation" is required and information about a specific location where a "deceleration operation" is required may be registered separately in the database 12A as information about "stop target area" and information about "deceleration target area" respectively.

An engine ECU 13 is an ECU that controls the running of the engine of the vehicle 10. The engine ECU 13 is connected to an accelerator pedal sensor 22 that detects the degree of depression of an accelerator, a sensor that detects the amount of air taken in, and so on. Also, a drive circuit for a throttle valve and drive circuits for various devices such as a fuel injection valve are also connected to the engine ECU 13. The engine ECU 13 grasps, for example, the running state of an engine based on detection signals input from each of the sensors and also outputs instruction signals to the drive circuit of each of the various devices. Thus, engine running control is executed through the engine ECU 13. In the present embodiment, upon reception of, for example, a deceleration assistance signal transmitted from the information-processing ECU 11 to the ECU 13, as a driving assistance signal, the engine ECU 13 executes deceleration assistance control that includes stopping the vehicle 10. As control for assisting deceleration, the engine ECU 13 is able to execute control reducing the number of engine revolutions, control for stopping fuel supply to the engine (i.e., fuel cut-off), and other such control.

The steering ECU 14 is an ECU that executes control for assisting steering through power steering control or the like. A steering angle sensor and a speed sensor 20 are connected to the steering ECU 14, and a steering assistance device such as a power steering device is also connected to the ECU 14. The steering ECU 14 obtains a steering angle based on a detection signal input from each sensor or the like, and outputs an instruction signal to the steering assistance device. When outputting an instruction signal, the steering ECU 14 may take the speed of the vehicle 10 into account. Thus, the steering assistance control is performed through the steering ECU 14. In the present embodiment, upon reception of, for example, a deceleration assistance signal transmitted from the information-processing ECU 11, as a driving assistance signal, the steering ECU 14 executes deceleration assistance control that includes stopping the vehicle 10. As control for assisting deceleration, the steering ECU 14 is capable of assisting steering during the application of braking due to a slippery road surface.

The braking ECU 15 is an ECU that controls the brake device of the vehicle 10. Various sensors such as the speed sensor 20 and brake pedal sensor 23 are connected to the braking ECU 15. Based on signals from various sensors, the braking ECU 15 causes the vehicle 10 to generate braking force through control of the braking device of the vehicle 10. Specifically, the braking ECU 15 controls the braking device by calculating and using the required braking force based on, for example, the speed of the vehicle 10 obtained from a signal from the speed sensor 20 and a signal from the brake pedal sensor 23, which indicates the degree of depression of the brake. In the present embodiment, upon reception of, for example, a deceleration assistance signal, as a driving assistance signal, transmitted from the information-processing ECU 11, the braking ECU 15 executes deceleration assistance control that includes stopping the vehicle 10. As control for assisting deceleration, the braking ECU 15 is capable of executing control or the like that includes auxiliary braking or assisted braking.

Additionally, a speaker 16 and a monitor 17, serving as output devices (user interfaces) that output drive assistance information to a driver, are electrically connected to the information-processing ECU 11.

The monitor 17 has a display screen including, for example, a liquid crystal display. This monitor 17 displays an image corresponding to data input from the information-processing ECU 11. By virtue of this, the information-processing ECU 11 is capable of outputting, via the monitor 17, drive assistance information in the form of an image, such as a caution or warning display, which draws the attention of the driver. Based on the deceleration assistance signal, for instance, the screen of the monitor 17 displays characters reading "Acceleration OFF" or an image or the like that means "Acceleration OFF."

The speaker 16 is a device that emits sound or voice. The speaker 16 outputs sound or voice corresponding to data input from the information-processing ECU 11. By virtue of this, the information-processing ECU 11 is capable of outputting, via the speaker 16, drive assistance information in the form of sound such as caution voice or warning sound, which draws attention of the driver. Based on a deceleration assistance signal, for example, the speaker 16 outputs voice saying "release the accelerator pedal" or a sound or the like instructing "release of the accelerator pedal."

Also, electrically connected to the information-processing ECU 11 are the speed sensor 20 that detects the speed of the vehicle 10, a GPS 21 that detects the position of the vehicle 10, the accelerator pedal sensor 22 that outputs the amount by which the accelerator pedal is operated, and the brake pedal sensor 23 that outputs the amount by which the brake pedal is operated.

The speed sensor 20 is a sensor used to detect vehicle speed. This sensor detects, for example, the revolution speeds of an axle and wheels, and outputs signals corresponding to the detected revolution speeds to the information-processing ECU 11. By virtue of this, the information-processing ECU 11 is capable of obtaining the current speed of the vehicle 10 and the distance by which the vehicle 10 has moved. In the present embodiment, the speed of the vehicle 10 is used to detect "the latest operation information" based on the vehicle operation performed by a driver at this time, or to detect a "vehicle movement." For example, the acceleration of the vehicle 10 is used to detect an "acceleration operation" and the deceleration of the vehicle 10 is used to detect a "deceleration operation."

The GPS 21 receives a GPS satellite signal in order to detect the position of the vehicle 10, and detects its current position based on the received GPS satellite signal. The GPS 21 outputs information about the detected current position to the information-processing ECU 11. By virtue of this, the information-processing ECU 11 is capable of obtaining the current position of the vehicle 10. Additionally, the information-processing ECU 11 is capable of detecting the travelling direction of the vehicle 10 based on a change in current position with time, which is detected by the GPS 21. In the present embodiment, the current position of the vehicle 10 is also used as "position information about operation" obtained when a vehicle operation is performed by a driver.

The accelerator pedal sensor 22 detects whether a driver is operating the accelerator pedal or not, and the degree of depression of the accelerator pedal. The accelerator pedal sensor 22 also outputs signals corresponding to the detected result of the presence or absence of the operation and the detected degree of depression of the pedal to the information-processing ECU 11. In the present embodiment, the degree of depression of the accelerator pedal is used to detect "the latest operation information" based on a vehicle operation performed by the driver at this time. For example, depression of the accelerator pedal is used to detect an "acceleration operation."

The brake pedal sensor 23 detects whether a driver has operated the brake pedal or not, and the degree of depression of the brake pedal. The brake pedal sensor 23 also outputs signals corresponding to the detected result of the presence or absence of the operation and the detected degree of depression of the pedal to the information-processing ECU 11. In the present embodiment, the degree of depression of the brake pedal is used as "the latest operation information" based on a vehicle operation performed by the driver at this time. For example, depression of the brake pedal is used to detect a "deceleration operation."

The information-processing ECU 11 includes, as its main component, a microcomputer that has a computing device and an internal storage device. In the information-processing ECU 11, various information processes based on various data and programs stored in the internal storage device or auxiliary storage device 12 are performed by the microcomputer. In the present embodiment, the information-processing ECU 11 learns setting by specifying "spot-specific operation information" for a "learning area" where learning has been newly started based on the execution of a learning program (which learning is referred to as "new learning"). Additionally, the information-processing ECU 11 executes a program for learning the repeatability of the "spot-specific operation information," which has been learned as a vehicle operation in the "learning area." Specifically, after the new learning, the information-processing ECU 11 learns based on the execution of the learning program whether the "spot-specific operation information" in the "learning area" is reproducible or not, that is, whether it is suitable or not to continue driving assistance based on the "spot-specific operation information" set in the "learning area" (which learning is referred to as "continuous learning"). The continuous learning is carried out based on whether the "vehicle operation specific to a spot" corresponding to the "learning area" conforms to a "driving operation by a driver" and "vehicle movement" in this "learning area," that is, whether the "vehicle operation specific to a spot" corresponding to the "learning area" has been reproduced or not (repeatability) in the "learning area."

To be more specific, the information-processing ECU 11 is provided with an operation information extracting section 31 that detects "the latest operation information," a "vehicle movement," and "position information about operation" based on execution of the learning program in the computing device, and position information-processing section 32 that specifies or sets a "learning area." Additionally, the information-processing ECU 11 is provided with an operation information learning section 33 that carries out a "new learning" or a "continuous learning" based on execution of the learning program in the computing device, and an assistance information output section 34 that outputs driving assistance information based on a "vehicle operation specific to a spot" corresponding to a "learning area."

The operation information extracting section 31 detects "the latest operation information" and "vehicle behavior" based on signals from various sensors. For example, based on the detection of "acceleration" from a signal transmitted by the speed sensor 20 and the detection of the "depression" of the pedal from a signal transmitted by the accelerator pedal sensor 22, the operation information extracting section 31 detects (obtains) "acceleration operation" as "the latest operation information." Additionally, for example, based on detection of "deceleration" from a signal transmitted by the speed sensor 20 and detection of the "depression" of the pedal from a signal transmitted by the brake pedal sensor 23, the operation information extracting section 31 detects (obtains) a "deceleration operation" as "the latest operation information." Also, based on the "acceleration" detected from a signal transmitted by the speed sensor 20, the operation information extracting section 31 detects "acceleration operation" as the "vehicle behavior" of the vehicle 10. Additionally, based on the detected "deceleration," the section 31 detects a "deceleration operation" as "vehicle behavior" of the vehicle 10. Furthermore, when detecting "the latest operation information" and the "vehicle operation," the operation information extracting section 31 obtains, based on a signal from the GPS 21, "position information about operation," which is information about position where the "vehicle operation" and "vehicle behavior" corresponding to the operation information has taken place.

The position information-processing section 32 obtains "the latest operation information," "vehicle behavior," and "position information about operation" from the operation information extracting section 31. Then, the position information-processing section 32 detects whether the position indicated by the "position information about operation" is included in a "deceleration target area" registered in the database 12A. Specifically, the position information-processing section 32 compares the position indicated by the "position information about operation" with the range of the "deceleration target area" registered in the database 12A. If the position indicated by the "position information about operation" is included in the range of the "deceleration target area," the processing section 32 sets "priority" as the value of "determination information" that is used to determine a level as in learning. In contrast, if the position indicated by the "position information about operation" is not included in the range of the "deceleration target area," the position information-processing section 32 sets "normal" as the value of the "determination information." That is, in a case where the type of information usable in learning or the like satisfies only "the latest operation information," "vehicle behavior," and "position information about operation," "normal" is set as the "determination information." In contrast, in a case where, for example, a "deceleration target area" is added to the type of information usable in learning or the like, "priority" is set as "determination information." Upon receipt of information indicating a position, the position information-processing section 32 detects a deceleration target area corresponding to the received position, and can also set "determination information" for the received position based on the detection result of the deceleration target area.

Additionally, the position information-processing section 32 detects a "learning area" that includes a position indicated by "position information about operation." Specifically, from the "learning area" registered in the database 12A, the position information-processing section 32 retrieves the "learning area" that includes the position indicated by the "position information about operation." Also, this section uses the "learning area" that includes the searched "position information about operation," as a "learning area" corresponding to "the latest operation information" and "vehicle behavior."

On the other hand, in a case where a "learning area" that includes "position information about operation" is not detected from the database 12A for, for example, the reason that operation information is obtained for the first time, the position information-processing section 32 newly creates, based on the "position information about operation", a "learning area" defined by the predetermined range that includes this "position information about operation." Then, the position information-processing section 32 correlates the created "learning area" with "the latest operation information" and "vehicle behavior," thereby allowing the start of the "new learning" corresponding to this "learning area."

The operation information learning section 33 obtains "the latest operation information," "vehicle behavior," "learning area," and "determination information" from the position information-processing section 32. Then, based on "the latest operation information," the "learning area," and the "determination information," the operation information learning section 33 learns, as "new learning," "operation information" suitable as "spot-specific operation information" in this "learning area," that is, highly repeatable. Incidentally, since "operation information" is based on a vehicle operation performed by a driver, this learning is equivalent to learning the repeatability of the vehicle operation performed by the driver in this "learning area." In the present embodiment, the number of items of "operation information" accumulated in the database 12A has an upper limit. Specifically, the total number of items of "the latest operation information" and the past "operation information" corresponding to one "learning area" is limited to ten. Because of this, in a case where the number of items of the "past operation information" has reached the upper limit, the operation information learning section 33 deletes past "operation information" that is beyond the upper limit, each time "the latest operation information" is added and registered.

Additionally, the operation information learning section 33 learns, as "continuous learning," whether driving assistance information for the "learning area" has repeatability or not. Specifically, the operation information learning section 33 determines whether the "spot-specific operation information" of the driving assistance information provided in the "learning area" conforms to "the latest operation information" that is the actual drive operation in the "learning area." For example, in a case where "the latest operation information" is a "deceleration operation" and "spot-specific operation information" is a "deceleration operation," the operation information learning section 33 determines that the "spot-specific operation information" conforms to "the latest information." In contrast, in a case where "the latest operation information" is a "deceleration operation" and "spot-specific operation information" is "acceleration operation," the operation information learning section 33 determines that the "spot-specific operation information" does not conform to "the latest operation information." Then, the operation information learning section 33 learns the repeatability of the "spot-specific operation information" provided by driving assistance information based on the determination result.

The assistance information output section 34 outputs driving assistance information corresponding to the current position of the vehicle 10 according to the contents registered in the database 12A. The assistance information output section 34 retrieves from the database 12A the "learning areas" including the current position of the vehicle 10, which are input one after another. If a "learning area" is not retrieved at, for example, an unlearned spot, the assistance information output section 34 does not output driving assistance information corresponding to the current position. If a "learning area" in new learning is retrieved, "spot-specific operation information" has not yet been set in this "learning area." Therefore, the assistance information output section 34 does not output driving assistance information. In contrast, if a "learning area" in the "continuous learning" is retrieved, the "spot-specific operation information" set to correspond to this "learning area" is output as driving assistance information by the assistance information output section 34. For example, in a case where a "deceleration operation" is set as "spot-specific operation information," the assistance information output section 34 outputs a deceleration assistance signal as a driving assistance signal corresponding to the "deceleration operation." On the other hand, in a case where "acceleration operation" is set as "spot-specific operation information," the output section 34 outputs an acceleration assistance signal as a driving assistance signal corresponding to the "acceleration operation."

If a "learning area" is detected based on the current position of the vehicle 10 but "the latest operation information" corresponding to this "learning area" is not detected, the assistance information output section 34 informs the operation information learning section 33 that "the latest operation information" has not been detected in this "learning area." For example, the output section 34 informs the learning section 33 of "no operations." Specifically, if the vehicle 10 passes through a "learning area" without performing an "acceleration operation" and a "deceleration operation," the operation information extracting section 31 cannot detect "operation information" in this "learning area." Therefore, the assistance information output section 34 provides "the latest operation information" corresponding to the "learning area," as "no operations." The operation information learning section 33 thereby learns "the latest operation information" in the existing "learning area" as "no operations."

Next, the learning of the repeatability of "spot-specific operation information" provided by the information-processing ECU 11 as driving assistance information will be described with reference to FIGS. 2 to 12.

Figure 2:
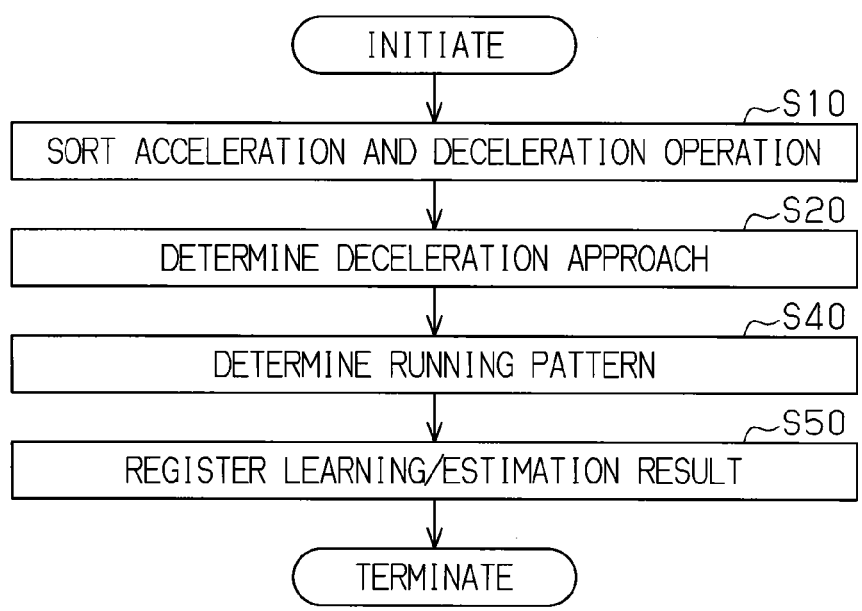
FIG. 2 is a flowchart of the procedure of a learning process performed by the vehicular information-processing device shown in FIG. 1.

As shown in FIG. 2, the operation information learning section 33 performs, as repeatability learning processes, an acceleration and deceleration operation sorting process (step S10 in FIG. 2), a deceleration approach determination process (step S20 in FIG. 2), a running pattern determination process (step S40 in FIG. 2), and a learned/estimated result registration process (step S50 in FIG. 2). Referring to FIG. 3, these processes will be described. In FIG. 3, vehicle operations performed by a driver are shown using (○) representing "Accelerator ON," (Δ) representing "Accelerator OFF," (●) representing "Brake ON," and (▲) representing "Brake OFF."

Figure 3A:
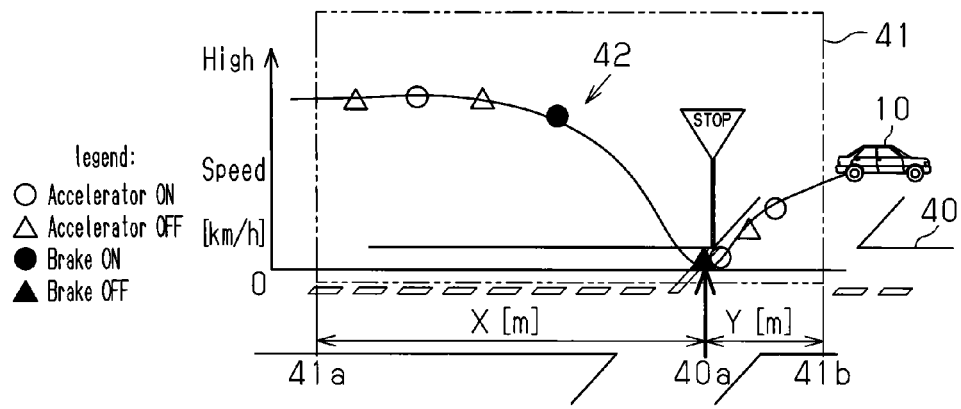
FIG. 3 is a diagram illustrating a vehicle movement analysis in the vehicular information-processing device shown in FIG. 1, in which section (a) is a chart schematically showing vehicle movement in the form of speed, section (b) is a chart schematically showing vehicle operation with a lapse of time, section (c) is a chart schematically showing the relationship between the vehicle movement and vehicle operation, and (d) is a chart schematically showing the result of the analysis of the vehicle movement.

As shown in FIG. 3(a), when the vehicle 10 passes through a road 40 in which a stop target position 40a is set at which the vehicle 10 must stop temporarily (i.e., halt), its speed changes to reach the lowest speed, in this case, "0" at the stop target position 40a, as shown by a graph 42. A speed change like that is mostly affected by vehicle operations performed by a driver, such as "Accelerator ON (○)," "Accelerator OFF (Δ)," "Brake ON (●)," "Brake OFF (▲)," or the like in the vehicle 10. These vehicle operations are detected by the information-processing ECU 11. Therefore, each of the detected driving operations can be represented by the speed graph 42.

In the present embodiment, an assistance target area 41 is set in order that the information-processing ECU 11 provide driving assistance for the stop target position 40a. This assistance target area 41 is set in the same range as the "learning area" that includes the stop target position 40a. The assistance target area 41 has the range in which a distance of X[m] and a distance of Y[m] are set on one side and on the other side, respectively, from the stop target position 40a in the traveling direction of the vehicle 10. The range where the information-processing ECU 11 monitors vehicle operations for "continuous learning" and "driving assistance" is equally set in the assistance target area 41. That is, the assistance target area 41 is provided based on the "learning area" set according to the previous running states of the vehicle 10.

The assistance target area 41 is set as the range where based on previous learning, driving assistance information is provided regarding a "deceleration operation" for the stop target position 40a. Thus, the vehicle 10 is provided with driving assistance for a "deceleration operation" when approaching the stop target position 40a. However, while vehicle operations detected in the range of the assistance target area 41 include a "deceleration operation" used to stop the vehicle 10 at the stop target position 40a, these vehicle operations also include, before and after the "deceleration operation," operations irrelevant to stopping the vehicle 10 at the stop target position 40a, such as ones resulting from driver habit, interference from other vehicles, or road contours.

Figure 3B:
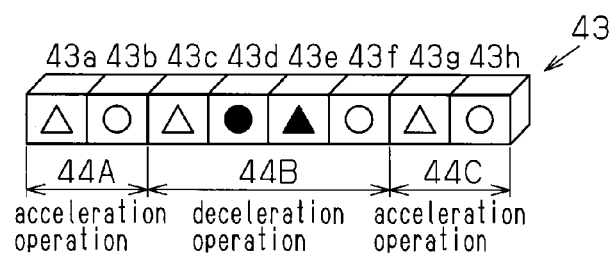

To overcome the foregoing problem, the operation information learning section 33 performs an acceleration and deceleration sorting process (step S10 in FIG. 2) first. In the acceleration and deceleration sorting process, the modes of vehicle operation in the assistance target area 41 are captured in the form of pedal operations such as "Accelerator ON (○)," "Accelerator OFF (Δ)," "Brake ON (●)," "Brake OFF (▲), and the like. Based on the captured pedal operations, the vehicle operations are sorted into an "acceleration operation" or a "deceleration operation." Specifically, the operation information learning section 33 sorts vehicle operations into an "acceleration operation" or a "deceleration operation" (i.e., distinguishes between them) according to a pedal operation list 43 in which vehicle operations performed in the vehicle 10 are arranged in a time series from the entry of the vehicle 10 into the assistance target area 41 to its exit therefrom, as shown in FIG. 3(b). In the pedal operation list 43, items of operation information are arranged to be more recent toward the right side of FIG. 3(b) than from the left.

That is, in the pedal operation list 43, vehicle operations performed in the vehicle 10 in the assistance target area 41 are arranged in a time series. Specifically, the pedal of the vehicle 10 is operated, for example, in the following order: "Accelerator OFF (Δ)" operation 43a, "Accelerator ON (○)" operation 43b, "Accelerator OFF (Δ)" operation 43c, "Brake ON (●)" operation 43d, "Brake OFF (▲)" operation 43e, and "Accelerator ON (○)" operation 43f. Subsequently, the pedal of the vehicle 10 is operated in the following order: "Accelerator OFF (Δ)" operation 43g and "Accelerator ON (○)" operation 43h.

The operation information learning section 33 compares the pedal operation order of the pedal operation list 43 with pedal operation orders set in advance as one corresponding to each type of vehicle operation, and thereby detects patterns corresponding to an "acceleration operation" and a "deceleration operation" from this pedal operation list 43. For example, in a case where the pedal operation order of an "acceleration operation" is set in the auxiliary storage device 12 as follows: "Accelerator OFF (Δ)" and "Accelerator ON (○)," the operation information learning section 33 detects operations 43a and 43b as a pattern corresponding to an "acceleration operation 44A," and also detects the operations 43g and 43h as a pattern corresponding to an "acceleration operation 44C." In addition, in a case where the pedal operation order of a "deceleration operation" is set as follows:

"Accelerator OFF (Δ)," "Brake ON (●)," "Brake OFF (▲)," and "Accelerator ON (○)," the operation information learning section 33 detects the operations 43c, 43d, 43e, and 43f as a pattern corresponding to a "deceleration operation 44B." In the auxiliary storage device 12, the process from when the previous "Accelerator ON (○)" is finished to when "Accelerator ON (○)" is finished at this time may be set as an "acceleration operation." Also, in a case where "Brake ON (●)," or "Brake OFF (▲)" is included in the process from when the previous "Accelerator ON (○)" is finished to when "Accelerator ON (○)" is finished at this time, a "deceleration operation," in particular, may be set in the auxiliary storage device 12.

Upon detection of each type of operation from the pedal operation list 43, the operation information learning section 33 performs a deceleration approach determination process, thereby determining whether the detected "deceleration operation" is intended for deceleration approach or not (step S20 in FIG. 2). Specifically, in the present embodiment, the operation information learning section 33 determines whether the deceleration operation 44B (i.e., a combination of operations 43c, 43d, 43e, and 43f) detected as the pattern of a "deceleration operation" is intended for deceleration approach or not. The deceleration approach means a running mode of the vehicle 10, in which the vehicle 10 approaches a target spot such as a stop target position 40a while decreasing speed.

Figure 4:
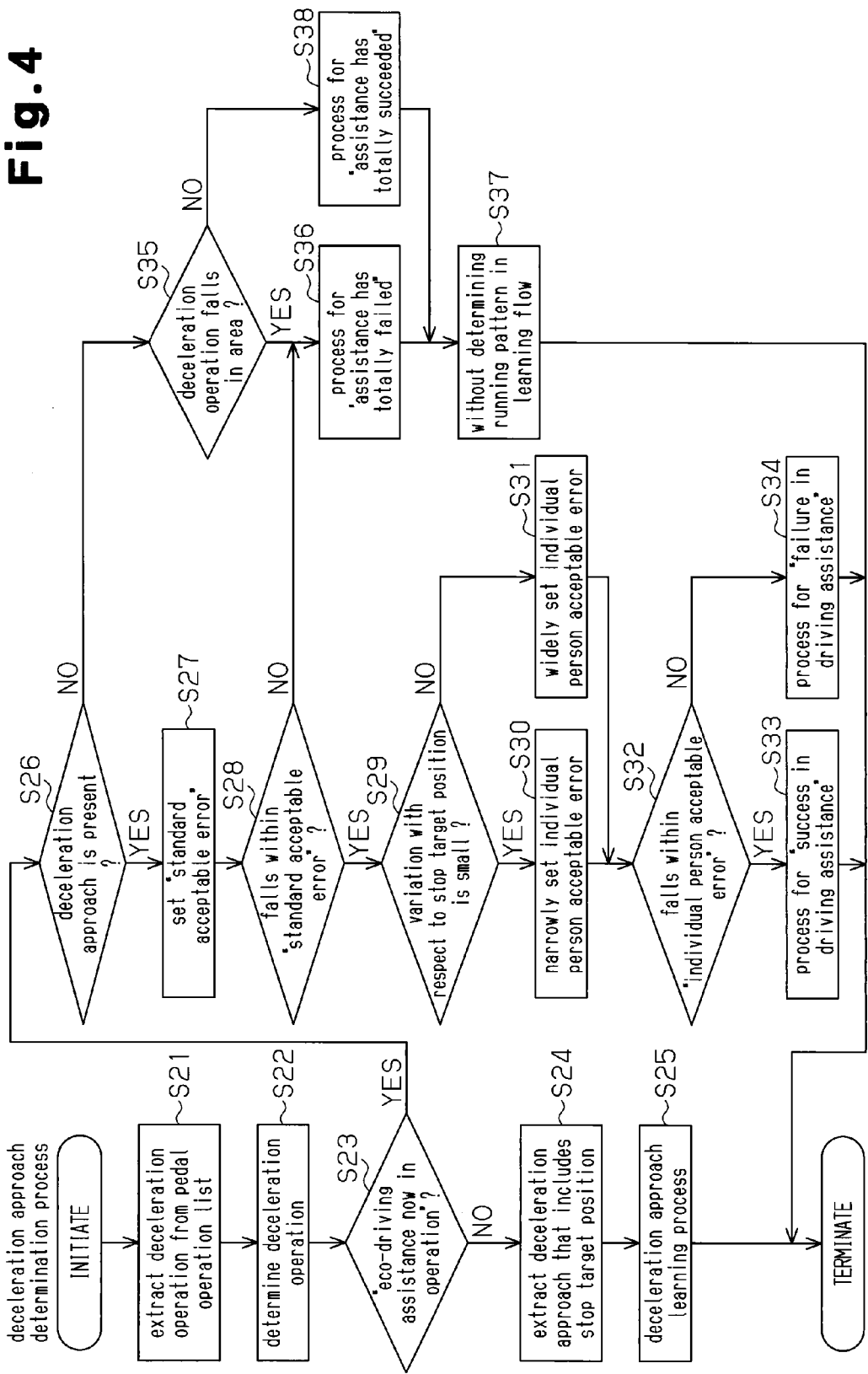
FIG. 4 is a flowchart illustrating the procedure of a vehicle operation analyzing process in the learning process in FIG. 2.

As shown in FIG. 4, the operation information learning section 33 extracts a pedal operation corresponding to a "deceleration operation" from various types of operations such as an "acceleration operation" and a "deceleration operation," into which vehicle operations are sorted based on the pedal operation list 43, by the deceleration approach determination process (step S21 in FIG. 4). The operation information learning section 33 determines whether the pedal operation corresponding to the extracted "deceleration operation" is intended for deceleration approach or not and stores the determination result (step S22 in FIG. 4). Whether the pedal operation is intended for the deceleration approach or not is determined based on whether a first determination condition AP1 or second determination condition AP2, which is a condition for determining deceleration approach, is satisfied or not.

Figure 3C:
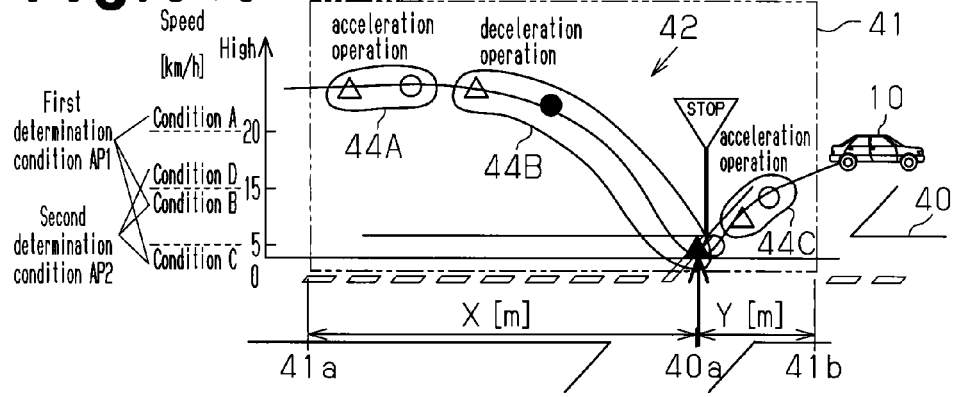

The first determination condition AP1 is composed of three conditions A to C and is used when "Brake ON (●)" takes place after "Accelerator OFF (Δ)" at the time of pedal operation. At this time, the condition A means that deceleration is started at a vehicle speed of 20 km/h or higher by "Accelerator OFF (Δ)," the condition B means that deceleration is finished at a vehicle speed of 15 km/h or lower by "Brake OFF (▲)," and the condition C means that creep is started at a vehicle speed of 5 km/h or lower by "Brake OFF (▲)." For example, as shown in FIG. 3(c), the deceleration operation 44B satisfies the condition A since deceleration by "Accelerator OFF (Δ)" operation 43c is started at a vehicle speed of 20 km/h or higher. Also, the deceleration operation 44B satisfies the condition B since deceleration is finished at a vehicle speed of 15 km/h or lower by the "Brake OFF (▲)" operation 43e. Additionally, the deceleration operation 44B satisfies the condition C since creep by the "Brake OFF (▲)" operation 43e is started at a vehicle speed of 5 km/h or lower. Accordingly, the operation information learning section 33 determines based on the first determination condition AP1 that the deceleration operation 44B is intended for deceleration approach.

The second determination condition AP2 includes three conditions B to D and is used to make determination when pedal operation does not include "Accelerator OFF (Δ)". At this time, the conditions B and C are the same as those described above, and the condition D means that deceleration is started at a vehicle speed of 15 km/h or higher by "Brake ON (●)" operation. That is, according to the second determination condition AP2, even when a "deceleration operation" does not include "Accelerator OFF (Δ)" pedal operation, determination can be made that the "deceleration operation" is intended for deceleration approach. Accordingly, the operation information learning section 33 is capable of determining based on the second determination condition AP2 whether the "deceleration operation" that does not include "Accelerator OFF (Δ)" pedal operation is intended for deceleration approach or not.

When determination of deceleration approach is terminated, the operation information learning section 33 determines whether driving assistance for the vehicle 10 is "eco-driving assistance now in operation" or not (step S23 in FIG. 4).

When "eco-driving assistance now in operation" is not determined (NO in step S23 in FIG. 4), the operation information learning section 33 extracts only one deceleration approach that includes the stop target position 40a, from one or more determined deceleration approaches (step S24 in FIG. 4). In the present embodiment, the stop target position 40a is included in the extent of roadway (i.e., travelling range) corresponding to the deceleration operation 44B. Therefore, for example, the extent of roadway corresponding to the deceleration operation 44B is extracted as deceleration approach. Upon extraction of only one deceleration approach, the operation information learning section 33 performs a learning process for the deceleration approach (step S25 in FIG. 4). In the learning process for deceleration approach, the operation information learning section 33 adds one to the number of times that deceleration is carried out in a corresponding assistance target area 41, that is, "learning area." In other words, the number of times that deceleration is carried out is counted up (augmented). If deceleration approach is not extracted, the number of times that deceleration is carried out is not counted up. Then, the operation information learning section 33 terminates the deceleration approach determination process.

In contrast, when "eco-driving assistance now in operation" is determined (YES in step S23 in FIG. 4), the operation information learning section 33 determines based on the determination in step S22 whether a deceleration approach is present or not (step S26 in FIG. 4). If the determination is made that deceleration approach is not present (NO in step S26 in FIG. 4), another determination is made whether a "deceleration operation" of the vehicle 10 is present in the assistance target area 41 or not (step S35 in FIG. 4). The "deceleration operation" of the vehicle 10 is determined based on the presence or absence of pedal operation performed by a driver. That is, the presence or absence of a "deceleration operation (pedal operation)" that has not been determined as the deceleration approach is detected.

If the determination is made that a "declaration operation" is not present (NO in step S35 in FIG. 4), the operation information learning section 33 determines that "the driving assistance has succeeded," that is, "the driving assistance has greatly succeeded." Then, the operation information learning section 33 performs a learning process based on the determination that "the driving assistance has greatly succeeded," that is, based on the fact that the provided driving assistance conforms to the vehicle operations performed by a driver (step S38 in FIG. 4). The learning process based on "the driving assistance has greatly succeeded" means to set "great success in assistance" as the result of driving assistance in the assistance target area 41.

If the vehicle operation performed by a driver for the vehicle 10 in the assistance target area 41 falls in a range that conforms to the vehicle operation indicated by the "spot-specific operation information" of driving assistance information, the present embodiment determines that "the driving assistance has succeeded." In particular, if the actual "deceleration operation" of the vehicle 10 in the assistance target area 41 falls in a range that conforms to a deceleration operation to be performed by the vehicle 10 according to the "spot-specific operation information" of driving assistance information, the present embodiment determines that "driving assistance has greatly succeeded." That is, "driving assistance has greatly succeeded" is determined when it can be presumed that the vehicle movement result obtained by driving assistance information and the actual resulting movement of the vehicle 10 conform to each other. To be specific, the meaning of "driving assistance has greatly succeeded" includes the case where vehicle behavior corresponding to deceleration approach without a driver's performing a braking operation has been carried out, as in the case where deceleration in deceleration approach is not carried out by pedal operation but is carried out by engine braking or regenerative braking. For example, by decreasing the number of times that a braking operation is performed at a stop position or on a curve, the possibility of improving fuel economy and regenerating electrical energy increases. That is, when a determination is made that "driving assistance has greatly succeeded," the assistance effect may be maximal. On the other hand, in a case where the presence or absence of a "deceleration operation" by pedal operation is directly used to determine whether the assistance has succeeded or failed, determination might be made that the driving assistance has failed even though the assistance effect is maximal as in the case described above.

Then, not carrying out the running pattern determination (step S40 in FIG. 2) is set (step 37 in FIG. 4). This is because the running pattern determination is unnecessary in this case.

In contrast, if a determination is made that a "deceleration operation" is present in the assistance target area 41 (YES in step S35 in FIG. 4), a determination is made that "the driving assistance has failed" or "the driving assistance has totally failed." Additionally, based on the fact that "the driving assistance has totally failed," that is, the fact that the provided driving assistance does not conform to the vehicle operation that a driver is performing, a learning process is carried out (step S36 in FIG. 4). The learning process based on the fact that "the driving assistance has totally failed" means that "total failure in assistance" is set as the result of the driving assistance in the assistance target area 41.

In the present embodiment, if a driver's vehicle operation for the vehicle 10 in the assistance target area 41 does not conform to a vehicle operation indicated by the "spot-specific operation information" of driving assistance information, the determination is made of "failure in driving assistance." In particular, if the actual "deceleration operation" of the vehicle 10 in the assistance target area 41 does not conform at all to a deceleration operation to be performed by the vehicle 10 according to the "spot-specific operation information" of driving assistance information, as in a case where the actual "deceleration operation" significantly deviates from an acceptable range, the determination is made of "total failure in driving assistance." Specifically, "total failure in driving assistance" includes a case where there is no driver's braking operation and where deceleration approach has failed with respect to the acceptable range that includes the stop target position 40*a*, as in a situation where the vehicle has passed through the stop target position 40*a* without performing deceleration in deceleration approach.

Then, not carrying out the running pattern determination (step S40 in FIG. 2) is set (step S37 in FIG. 4).

If a determination is made that deceleration approach is present (YES in step S26 in FIG. 4), "standard acceptable error" is set as an error acceptable range reference for the stop target position 40*a* (step S27 in FIG. 4), and a determination is made whether the stop position of the vehicle 10 in this deceleration approach falls within the range set as "standard acceptable error" (step S28 in FIG. 4). Specifically, based on whether the difference between the spot-specific operation information (stop position), provided in the driving assistance information, and the result (actual stop position) of a driver's vehicle operation falls within the "standard acceptable error," a determination is made whether the spot-specific operation information conforms to the driver's vehicle operation. If the stop position of the vehicle 10 is determined not to be within the range set as the "standard acceptable error" (NO in step S28 in FIG. 4), the operation information learning section 33 determines that "the driving assistance has totally failed," or the driving assistance does not conform to the driver's vehicle operation. Then, as in the case described above, the operation information learning section 33 performs a learning process based on the determination made of "total failure in driving assistance" (step S36 in FIG. 4). Additionally, not carrying out the running pattern determination (step S40 in FIG. 2) is set (step S37 in FIG. 4). Specifically, the total failure in driving assistance at this time includes a case where although the driver has performed the braking operation, deceleration approach for the stop target position 40*a* could not be suitably made, as in a situation where, although braking has been applied, the vehicle passed through the stop target position 40*a* without suitably performing deceleration approach.

If a determination is made that the stop position of the vehicle 10 falls within a range set as "standard acceptable error" (YES in step S28 in FIG. 4), the operation information learning section 33 sets an "individual person set range," which is an error acceptable range set for each individual driver. Therefore, the operation information learning section 33 determines whether variation in the past stop positions of the vehicle 10 with respect to the stop target position 40*a* is small or not (step S29 in FIG. 4). If variation in the stop positions with respect to the stop target position 40*a* is determined to be small (YES in step S29 in FIG. 4), the operation information learning section 33 narrows the individual person set range, or the acceptable error set for each driver (step S30 in FIG. 4). In contrast, if variation in the stop positions with respect to the stop target position 40*a* is determined not to be small (NO in step S29 in FIG. 4), the operation information learning section 33 widens the individual person set range, or the acceptable error set for each individual driver (step S31 in FIG. 4).

Upon setting of the individual person set range, the operation information learning section 33 determines whether the stop position of the vehicle 10 falls within the range set as "individual person acceptable error" or not (step S32 in FIG. 4). Specifically, based on whether the difference between the spot-specific operation information (stop position), provided in the driving assistance information, and the result (actual stop position) of a driver's vehicle operation falls within the "individual person acceptable error," a determination is made whether the spot-specific operation information conforms to the driver's vehicle operation. If the stop position of the vehicle 10 is determined to be within the range set as the "individual person acceptable error" (YES in step S32 in FIG. 4), the operation information learning section 33 determines that "the driving assistance has succeeded," or the driving assistance conforms to the vehicle operation that the driver has performed. Then, the operation information learning section 33 performs a learning process based on the determination made of "success in driving assistance" (step S33 in FIG. 4). The learning process based on "success in driving assistance" means, for example, that "success in assistance" is set as the result of driving assistance in the assistance target area 41. Specifically, success in driving assistance at this time includes a case where the vehicle 10 could carry out deceleration approach for the stop target position 40a by the driver's braking operation, as in a situation where deceleration approach is suitably performed by a braking operation, thus stopping the vehicle 10 at the stop target position 40a.

In contrast, if a determination is made that the stop position of the vehicle 10 is not within the range set as "individual person acceptable error" (NO in step S32 in FIG. 4), a determination is made of "failure in driving assistance." Additionally, based on the determination made of "driving assistance has failed," or that the driving assistance does not conform to the driver's vehicle operation, a learning process is carried out (step S34 in FIG. 4). A learning process based on "failure in driving assistance", for example, sets "failure in assistance" as the result of driving assistance in the assistance target area 41. Then, the operation information learning section 33 terminates the determination process for deceleration approach. Such driving assistance failure includes, for example, a case where although a driver has performed a braking operation, deceleration approach cannot be carried out for the acceptable range that includes the stop target position 40a. Specifically, failure in driving assistance includes a situation where although braking has been applied, the vehicle 10 stops in front of or beyond the stop target position 40a without suitably performing deceleration approach for the acceptable range that includes the stop target position 40a.

Variation in the stop position of the vehicle 10 for the stop target position 40a and "individual person acceptable error" set based on the variation will now be described with reference to FIG. 5.

Normally, the speed of the vehicle 10 changes to reach the lowest speed at the stop target position 40a, that is, substantially "0 km/h." However, in a case where the vehicle 10 passes through the assistance target area 41 more than one time, the positions where the speed reaches its lowest (the lowest speed positions) may be concentrated in a narrow range or may be spread over a wide range. The change in speed of the vehicle 10 is greatly affected by the driver's operation of the vehicle, that is, the driver's taste in driving. Therefore, the individual person acceptable error 47 is set narrower for each driver than the standard acceptable error 46. By determining success or failure in driving assistance from an individual person acceptable error 47 that is narrower than the standard acceptable error 46, there is an enhanced possibility of providing driving assistance matching the driver's taste (intention or sensibility).

Figure 5A:
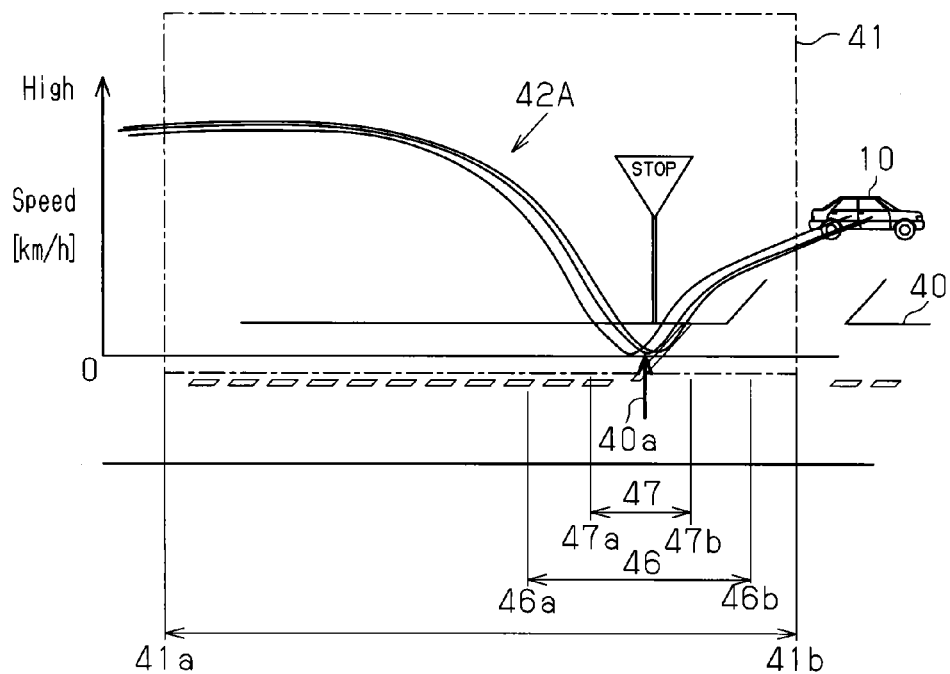
FIG. 5 is a diagram schematically showing a vehicle movement detected by the vehicular information-processing device shown in FIG. 1, in which section (a) is a chart schematically showing a case where variation in vehicle movement with respect to a target position is small and section (b) is a chart schematically showing a case where variation in vehicle movement with respect to a target position is large.

FIG. 5(a) shows the case where the positions in which the vehicle reaches its lowest speed are concentrated in a narrow range. As shown in FIG. 5(a), changes in the speed of a vehicle 10 that has passed through an assistance target area 41 of a road 40 more than one time are as follows: a substantially similar speed change 42A is repeated with respect to the stop target position 40a. In this case, if the standard acceptable error 46 (from the beginning point 46a to the end point 46b) is set within the range (from the beginning point 41a to the end point 41b) of the assistance target area 41, the lowest speed positions may be concentrated in an individual person acceptable error 47 (from the beginning point 47a to the end point 47b) narrower than the range of the standard acceptable error 46. At this time, a range narrower than the standard acceptable error 46 is set to serve as the individual person acceptable error 47. Thus, a range narrower than the standard acceptable error 46 is set as the individual person acceptable error 47 for the driver, and, based on this individual person acceptable error 47, a determination is made whether driving assistance has succeeded or failed (whether the driving assistance has conformed or not). Accordingly, there is an enhanced possibility that the determination result of success or failure in the driving assistance conforms to the driver's taste (intension or sensibility).

Figure 5B:
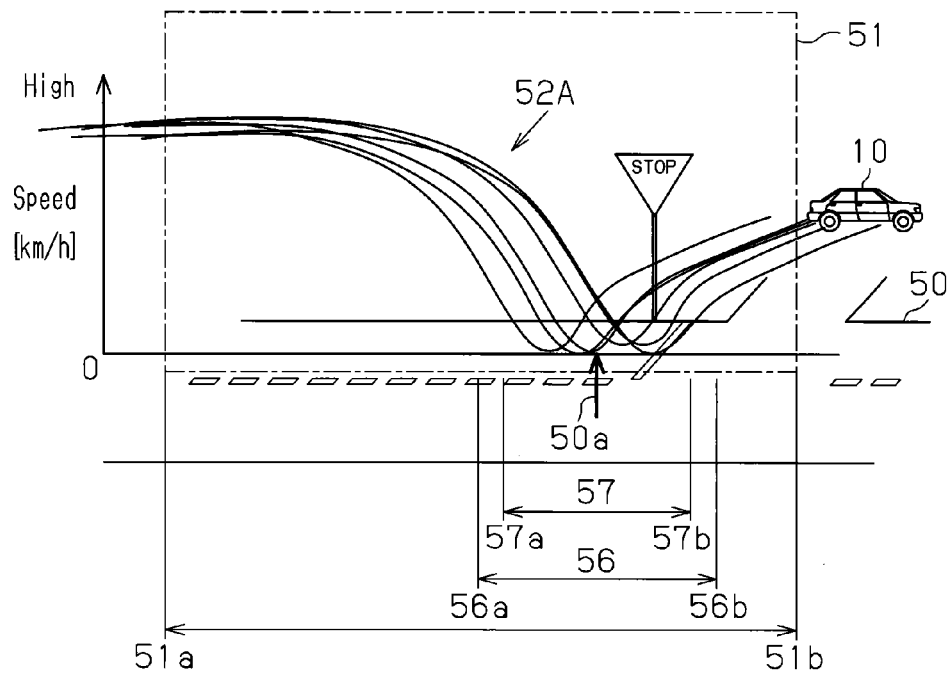

FIG. 5(b) shows the case where the lowest speed positions are spread over a wide range. As shown in FIG. 5(b), changes in the speed of a vehicle 10 that has passed through an assistance target area 51 of a road 50 more than one time are as follows: a substantially similar speed change 52A is repeated for the stop target position 50a. The speed change 52A varies more widely than the speed change 42A mentioned above. In this case, if the standard acceptable error 56 (from the beginning point 56a to the end point 56b) is set within the range (from the beginning point 51a to the end point 51b) of the assistance target area 51, the lowest speed positions may spread over a range almost the same as the standard acceptable error 56 or over a range almost the same as the individual person acceptable error 57 (from the beginning point 57a to the end point 57b), slightly narrower than the range of the standard acceptable error 56. At this time, the range almost the same as or slightly narrower than the range of the standard acceptable error 56 is set as individual person acceptable error 57. Thus, a range wider than the individual person acceptable error 47 described above but narrower than the standard acceptable error 56 is set as the individual person acceptable error 57 for the driver. Based on this individual person acceptable error 57, a determination is made whether the driving assistance has succeeded or failed (whether the driving assistance has conformed or not). Accordingly, there is an enhanced possibility that the determination result of success or failure in the driving assistance conforms to the driver's taste (intension).

Figure 6:
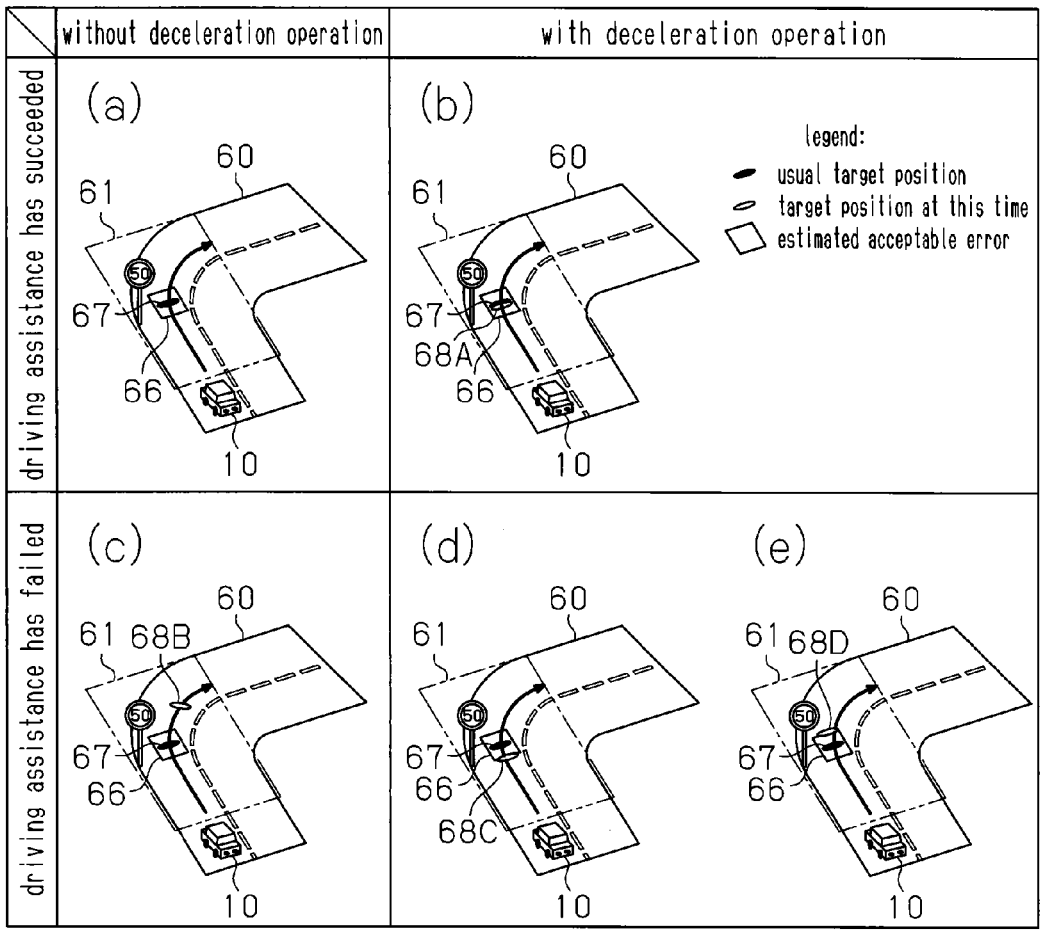
FIG. 6 is an exemplary diagram showing whether a driving assistance by the vehicular information-processing device shown in FIG. 1 has conformed to vehicle movement, in which section (a) is a chart schematically illustrating a case where there is conformity without a deceleration operation, section (b) is a chart schematically showing a case where there is conformity by performing a deceleration operation, section (c) is a chart schematically showing a case where there is no conformity without a deceleration operation, and section (d) and section (e) are charts schematically showing cases where there is no conformity even though deceleration operation has been performed.

Incidentally, the determination of success or failure in driving assistance when the vehicle 10 passes through a curve will now be described with reference to FIG. 6. FIGS. 6(a) to 6(e) schematically illustrate the determination whether driving assistance information provided for the vehicle 10 conforms to the vehicle operation a driver is performing when the position of "the usual target 67" that includes an acceptable range 66 is used as the target position where driving assistance (in this case, deceleration assistance) requires the lowest speed of the vehicle 10. In the present embodiment, a deceleration operation by a driver include operations based on pedal operation, and does not include operations that do not rely on pedal operation, as in engine braking or regenerative braking. That is, vehicle operations by a driver include vehicle steering according to driver's intention (taste) such as: pedal operation; operations that do not rely on pedal operation as in engine braking or regenerative braking; or deceleration that occurs without operation.

FIG. 6(a) shows a case where a deceleration operation (pedal operation) by a driver is not present but the speed of the vehicle 10 falls in a range determined to conform to a deceleration operation to be performed by a vehicle operation based on driving assistance information. That is, it shows a case where a determination is made NO in step S35 in FIG. 4.

At this time, the information-processing ECU 11 determines that "the assistance has greatly succeeded."

FIG. 6(b) shows a case where a determination is made that deceleration approach by a driver's deceleration operation (pedal operation) is present and also a determination is made that the lowest speed position (target position 68A) at this time is within an acceptable range 66 (individual person acceptable range). That is, it shows a case where a determination is made YES in step S32 in FIG. 4. At this time, the information-processing ECU 11 determines that "the assistance has succeeded."

FIG. 6(c) shows a case where driver's deceleration operation (pedal operation) is not present and, in addition, the speed of the vehicle 10 does not conform to a deceleration operation to be performed by a vehicle operation based on driving assistance information, for example, a case where the lowest speed position (target position 68B) at this time deviates significantly from the usual target position 67. That is, it shows a case where a determination is made YES in step S35 in FIG. 4. At this time, the information-processing ECU 11 determines that "the assistance has totally failed."

FIG. 6(d) shows a case where a determination is made that deceleration approach by driver's deceleration operation (pedal operation) is present and the lowest speed position at this time (target position 68C) slightly deviates from the acceptable range 66 (individual person set range) in front of this range 66. That is, it shows a case where NO is determined in step S32 in FIG. 4. At this time, the information-processing ECU 11 determines that "the assistance has failed." Incidentally, the lowest speed position (target position 68C) at this time is within the acceptable range for the standard acceptable error. Therefore, in a case where the standard acceptable error is used, the information-processing ECU 11 can determine that the assistance has succeeded.

FIG. 6(e) shows a case where a determination is made that deceleration approach by driver's deceleration operation is present and the lowest speed position (target position 68D) at this time deviates slightly from the acceptable range 66 (individual person set range) beyond this range 66. That is, it shows a case where a determination is made NO in step S32 in FIG. 4. At this time, the information-processing ECU 11 determines that "the assistance has failed." Incidentally, the lowest speed position (target position 68C) at this time is within the acceptable range for the standard acceptable error. Therefore, in a case where the standard acceptable error is used, the information-processing ECU 11 can determine that the assistance has succeeded.

Next, a running pattern determination process will be described.

Figure 3D:
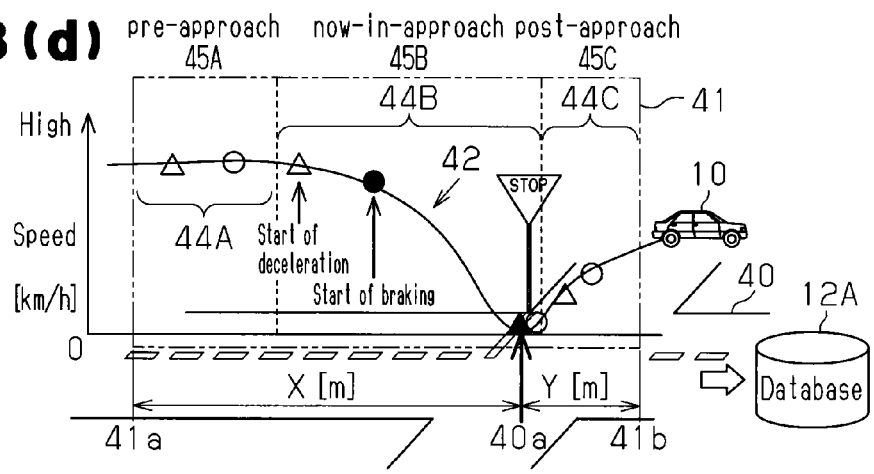

In a running pattern determination process (step S40 in FIG. 2), an "acceleration operation" and a "deceleration operation" are assigned as blocks in the assistance target area 41, as shown in FIG. 3(d). Specifically, the range including acceleration operation 44A, which is adjacent to the beginning point 41a of the assistance target area 41, is assigned as a block labeled with pre-approach 45A, whereas the range including acceleration operation 44C, which is adjacent to the end point 41b of the assistance target area 41, is assigned as a block labeled with post-approach 45C. The range between the pre-approach 45A block and the post-approach 45C block is assigned as a block labeled with now-in-approach 45B. That is, the now-in-approach 45B block includes deceleration operation 44B. Then, the running pattern determination process is terminated. In a case where not carrying out the running pattern determination (step S40 in FIG. 2) is set in step S37 in FIG. 4, this running pattern determination process is terminated without performing the foregoing steps.

Figure 7:
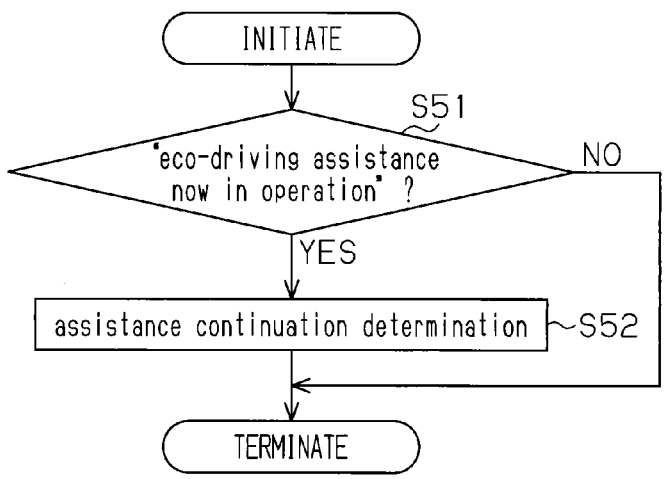
FIG. 7 is a flowchart of the procedure of continuation determining process for driving assistance in the learning process shown in FIG. 2.

Upon finishing the running pattern determination process (step S40 in FIG. 2), a learned/estimated result registration process (step S50 in FIG. 2) is carried out. As shown in FIG. 7, upon start of the learned/estimated result registration process, the operation information learning section 33 determines whether driving assistance is "eco-drive now in operation" or not (step S51 in FIG. 7). If a determination is made that the driving assistance is not "eco-drive now in operation" (NO in step S51 in FIG. 7), the operation information learning section 33 terminates the learned/estimated result registration process. That is, the learning process for repeatability is terminated (flow in FIG. 2 ends).

Figure 8:
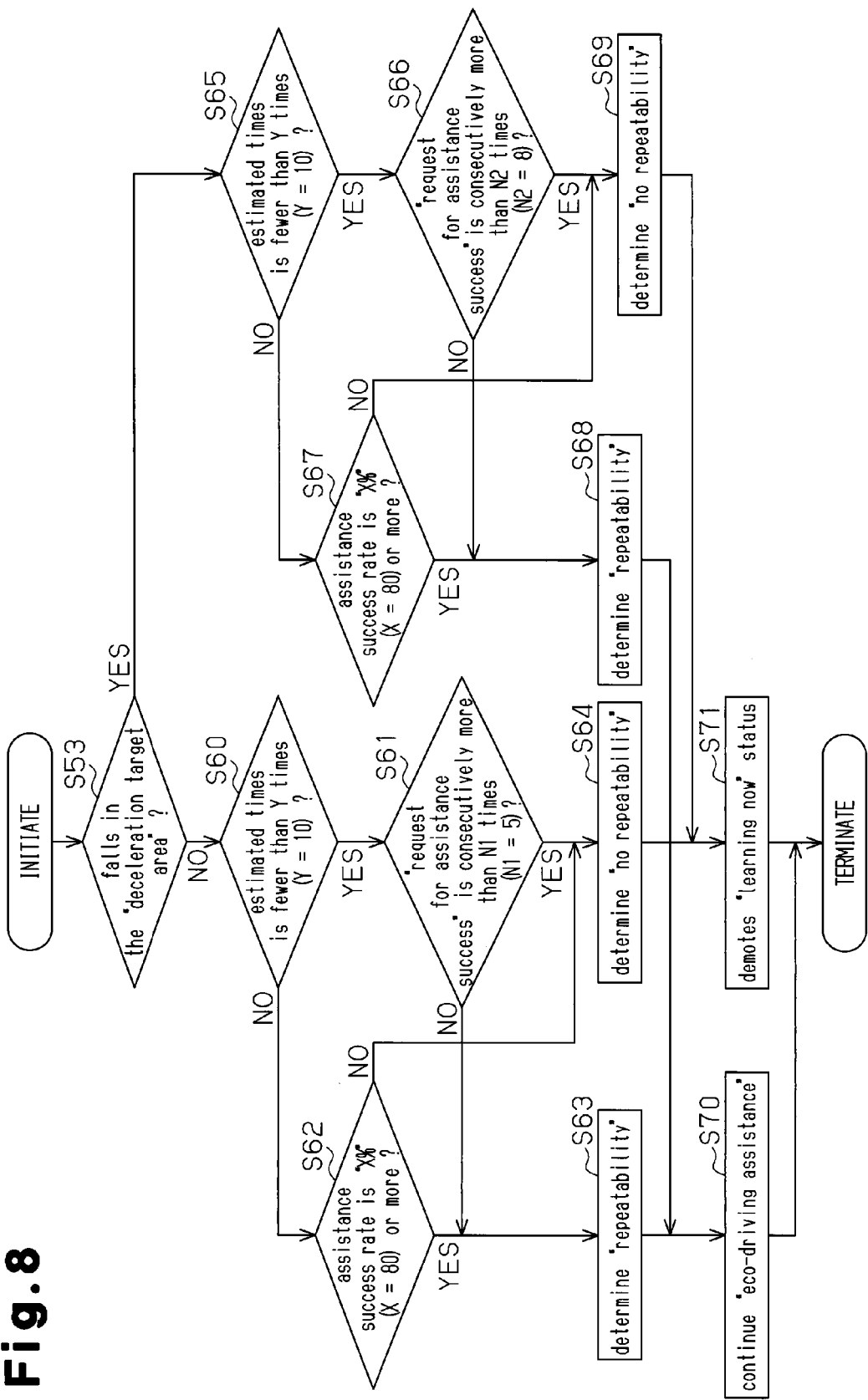
FIG. 8 is a flowchart of the detailed procedure of the continuation determining process for driving assistance shown in FIG. 7.

In contrast, if a determination is made that the driving assistance is "eco-drive now in operation" (YES in step S51 in FIG. 7), the operation information learning section 33 performs an assistance continuation determining process (step S52 in FIG. 7). To be specific, according to the assistance continuation determining process, as illustrated in FIG. 8, the operation information learning section 33 determines whether "the lowest speed position" corresponding to the deceleration operation 44B, that is, speed "0" is included in the "deceleration target area" or not (step S53 in FIG. 8). Specifically, when "determination information" based on "the lowest speed position" set by the position information-processing section 32 is "normal," a determination is made that "the lowest speed position" is not included in the "deceleration target area." If "priority determination" is set as determination information, a determination is made that "the lowest speed position" is included in the "deceleration target area." Thus, the operation information learning section 33 determines whether the learning of the presence or absence of the repeatability of "assistance target operation" is carried out based on "normal determination" or "priority determination." A "normal determination" process and a "priority determination" process differ in "the number of times that the same type of determination is made in succession" (hereafter also referred to as "the number of times that the same determination is made in succession") in order to determine repeatability. However, they are identical in processing order (flow). Additionally, examples of "the same type of determination" include a "deceleration operation" (which may include a "deceleration movement") and "acceleration operation" (which may include "acceleration movement"). In terms of "type," as long as operations or movement being able to be determined as a "type" of operation or movement of the vehicle 10, any type of operation or movement may be defined according to intended purpose.

If a determination is made that "the lowest speed position" is not included in the "deceleration target area" since "normal" is set as "determination information" (NO in step S53 in FIG. 8), the operation information learning section 33 performs the "normal determination" process. As a result, "the successive number (N1) for normal determination" is set as "the number of times that the same determination is made successively" for determining repeatability. At this time, five times is set as N1.

Subsequently, the operation information learning section 33 determines whether the number of times that the vehicle 10 has passed through the assistance target area 41 is fewer than ten times (Y=10) (step S60 in FIG. 8). In the present embodiment, the maximum number of items of operation information used for learning is ten. Therefore, in the learning of repeatability, only ten items of the latest operation information in the assistance target area 41 are used.

If a determination is made that the number of times that the vehicle 10 has passed through the assistance target area 41 is not fewer than ten times, that is, if the vehicle has passed through it ten or more times (NO in step S60 in FIG. 8), the operation information learning section 33 determines whether an assistance success rate as a percentage of assistance success is "80%" (X=80) or more (step S62 in FIG. 8). Whether an assistance success rate is "80%" or more is determined based on whether eight or more of 10 items of the latest operation information include "success in assistance" or "great success in assistance".

If an assistance success rate is determined to be "80%" or more (YES in step S62 in FIG. 8), the operation information learning section 33 determines that the "spot-specific operation information" corresponding to the assistance target area 41 has "repeatability." The operation information learning section 33 also determines to continue driving assistance based on the "spot-specific operation information" again the next time (step S63 in FIG. 8). Then, based on the result of this determination, the operation information learning section 33 operates such that "eco-driving assistance" serving as a vehicle operation that reduces fuel consumption of the vehicle 10 can be continued (step S70 in FIG. 8).

In contrast, if the assistance success rate is determined to be less than "80%" (NO in step S62 in FIG. 8), the operation information learning section 33 determines that the "spot-specific operation information" corresponding to the assistance target area 41 has "no repeatability" (step S64 in FIG. 8). Then, the operation information learning section 33 clears the "spot-specific operation information" corresponding to the assistance target area 41. Also, it demotes the status of the assistance target area 41 to a "learning now" status in which "spot-specific operation information" has not been set (step S71 in FIG. 8). For example, the operation information learning section 33 clears the learning result of the assistance target area 41, and initiates new learning again.

If the number of times that the vehicle 10 has passed through the assistance target area 41 is fewer than ten times (YES in step S60 in FIG. 8), the operation information learning section 33 determines whether the number of times that "request for assistance success" is made consecutively is more than five times (N1=5) or not (step S61 in FIG. 8). The number of times that "request for assistance success" is made consecutively is a value used to determine the repeatability of "spot-specific operation information" when the number of times that the vehicle has passed through the assistance target area 41 is fewer than ten times. As described in detail below, the number of times that "request for assistance success" is made consecutively is set as the number of times that the same type of vehicle operation is performed consecutively. If a determination is made that the number of times that "request for assistance success" is made consecutively is not more than five, that is, equal to or fewer than five times (NO in step S61 in FIG. 8), the operation information learning section 33 determines that the "spot-specific operation information" corresponding to the assistance target area 41 has "repeatability", as in the case where the determination is made "YES in step S62," which is described above. Then, the operation information learning section 33 determines to continue the driving assistance based on the "spot-specific operation information" again the next time (step S63 in FIG. 8). Thus, based on the result of the determination, the operation information learning section 33 operates such that "eco-driving assistance" can be continued (step S70 in FIG. 8).

In contrast, if the number of times that "request for assistance success" is made consecutively is more than five times (YES in step S61 in FIG. 8), the operation information learning section 33 determines that the "spot-specific operation information" corresponding to the assistance target area 41 has "no repeatability" (step S64 in FIG. 8), as in the case where the determination is made "NO in step S62," which is described above. Then, the operation information learning section 33 clears the "spot-specific operation information" corresponding to the assistance target area 41 and demotes the status of the assistance target area 41 to a "learning now" status in which "spot-specific operation information" has not been set (step S71 in FIG. 8).

If a determination is made that "the lowest speed position" is included in the "deceleration target area" since "priority" is set as "determination information" (YES in step S53 in FIG. 8), the operation information learning section 33 performs the "priority determination" process. As a result, "the number of times that the same determination is made successively" for determining repeatability" is set as the successive number (N2) for priority determination". At this time, N2 is set as eight times.

Subsequently, the operation information learning section 33 determines whether the number of times that the vehicle 10 has passed through the assistance target area 41 is fewer than ten times (step S65 in FIG. 8) or not, as in step S60, which is described above.

If a determination is made that the number of times that the vehicle 10 has passed through the "learning area" is not fewer than ten times, that is, the vehicle 10 has passed through the "learning area" ten or more times (NO in step S65 in FIG. 8), the operation information learning section 33 determines whether an assistance success rate is "80%" or more (step S67 in FIG. 8), as in the case of step S62, which is described above.

If the assistance success rate is determined to be "80%" or more (YES in step S67 in FIG. 8), the operation information learning section 33 determines that the "spot-specific operation information" corresponding to the assistance target area 41 ha "repeatability," as in the case of "step S63", which is described above. The operation information learning section 33 also determines to continue the driving assistance based on the "spot-specific operation information" again the next time (step S68 in FIG. 8). Then, the operation information learning section 33 operates such that "eco-driving assistance" can be continued (step S70 in FIG. 8).

In contrast, if the stop rate is determined to be less than "80%" (NO in step S67 in FIG. 8), the operation information learning section 33 determines that the "spot-specific operation information" corresponding to the assistance target area 41 has "no repeatability" (step S69 in FIG. 8), as with the case of "step S64", which is described above. Then, the operation information learning section 33 demotes the status of the assistance target area 41 to a "learning now" status, in which "spot-specific operation information" has not been set (step S71 in FIG. 8).

If the number of times that the vehicle 10 has passed through the assistance target area 41 is fewer than ten times (YES in step S65 in FIG. 8), the operation information learning section 33 determines whether the number of times that "request for assistance success" is made consecutively is more than eight times (N2=8) or not (step S66 in FIG. 8). If a determination is made that the number of times that "request for assistance success" is made consecutively is not more than eight times, that is, equal to or fewer than eight times (NO in step S66 in FIG. 8), the operation information learning section 33 determines that the "spot-specific operation information" corresponding to the assistance target area 41 has "repeatability", as in the case where the determination is made "YES in step S67," which is described above. Then, the operation information learning section 33 determines to continue driving assistance based on the "spot-specific operation information" again the next time (step S68 in FIG. 8). Thus, based on the result of the determination, the operation information learning section 33 operates such that "eco-driving assistance" can be continued (step S70 in FIG. 8).

In contrast, if the number of deceleration movements that takes place in succession is more than eight (YES in step S66 in FIG. 8), the operation information learning section 33 determines that the "spot-specific operation information" corresponding to the assistance target area 41 has "no repeatability" (step S69 in FIG. 8), as in the case where the determination is made "NO in step S67," which is described above. Then, the operation information learning section 33 demotes the status of the assistance target area 41 to a "learning now" status in which "spot-specific operation information" has not been set (step S71 in FIG. 8).

When the processing in step S70 or S71 terminates, the operation information learning section 33 also terminates the assistance continuation determination process.

Now, the successive number of "request for assistance success," mentioned above, namely, "the successive number (N1) for normal determination" and "the successive number (N2) for priority determination" will be explained with reference to FIGS. 9 to 12.

The graph 71 in FIG. 9 is in the form of a table, in which the vertical axis indicates the number of times that driving assistance information for the vehicle 10 is provided, that is, "the number of estimations" provided with "spot-specific operation information", whereas the horizontal axis indicates the number of times that the estimation conforms to a driver's vehicle operation, that is, "the number of assistance successes," which is the number of times that assistance has succeeded. The graph is sectioned in columns and rows. Furthermore, this graph 71 is sectioned by a heavy line into substantially left and right sides, which are referred to as sides A and B, respectively. Specifically, this graph 71 shows the rate of "the number of times that assistance has succeeded" per "the number of times that estimation is made." Rates of less than "80%" are shown on the side A and rates of "80%" or more, on the side B.

As shown in the graph 71, while the rate of the number of assistance successes per the number of estimations is "80%" or greater in a case where the number of estimations is fewer than ten times, the number of assistance successes is one time when the number of estimations is one. Similarly, while the rate of the number of assistance successes per the number of estimations is equal to or greater than "80%," the number of assistance successes is two times when the number of estimations is two times; three times when the number of estimations is three times; four times when the number of estimations is four times; four or more times when the number of estimations is five times; and five or more times when the number of estimations is six times. Similarly, while the rate of the number of assistance successes per the number of estimations is "80%" or greater, the number of "stop operations" is six times or more when the number of estimations is seven times; seven times or more when the number of estimations is eight times; and eight or more times when the number of estimations is nine times.

If the minimum number of times that assistance continuation determination is required is estimated to be ten, that is, a parameter to calculate the rate is ten, assistance continuation determination is made from the tenth time or thereafter in the case where the assistance continuation determination is made using "rate" in a conventional manner. It is assumed that the assistance continuation determination is made according to "rate" and the rate used as a determination reference is, for example, "80%." In this case, after the number of estimations made reaches ten or thereafter, the provision of driving assistance information is continued if the rate of the number of times that assistance has succeeded is "80%." If the rate for the number of times that assistance has succeeded is less than "80%," the provision of driving assistance information is cancelled.

The graph 72 in FIG. 10 is in the form of a table, in which the vertical axis indicates the number of times that driving assistance information for the vehicle 10 is provided, that is, "the number of estimations" provided with "spot-specific operation information", whereas the horizontal axis indicates the number of times that the estimation conforms to a driver's vehicle operations, that is, "the number of assistance successes," which is the number of times that assistance has succeeded. The graph is sectioned in columns and rows. Furthermore, this graph 72 is sectioned by a heavy line into substantially left and right sides, which are referred to as sides A and B, respectively. Specifically, this graph 72 shows the rate of "the number of times that assistance has succeeded" per "number of times that estimation is made." Shown on the side A of the graph 72 is "the number of times that assistance has succeeded" that will be required to make the rate of "assistance success" equal to "80%" or greater, that is, a successive number (as defined above). Shown on the side B of the graph 72 is "the number of assistance failures" that might occur. If assistance fails this number of times in succession, the rate of "assistance success" cannot be maintained at "80%" or greater.

The side A of the graph 72 will now be described in detail. For example, in order to make the rate of "assistance success" equal to "80%" or greater when the number of times that estimation is made is two, the number of times that assistance has succeeded per two times is one, and the rate of "assistance success" is "50%" (1/2), "assistance success" has to be made three more times (4/5=80%). Also, for example, in order to make the rate of "assistance success" equal to "80%" when the number of times that estimation is made is six and the number of times that assistance has succeeded per six times is two, that is, the rate of "assistance success" is "33%" (2/6), "assistance success" has to be made fourteen more times consecutively (16/20=80%).

The side A of the graph 72 shows the number of times that "assistance has succeeded" is required to make a percentage "assistance success," currently less than "80%," equal to "80%." Some of the successive numbers on the side A of the graph 72 have values so large as to be unrealistic. First, a realistic value will be described. For example, the successive number of times that is required is "three" when the number of estimations is two and the number of assistance successes from the two estimations is one. In this case, a percentage "assistance success" may reach "80%" at the fifth time fewer than ten times, which is the minimum number of estimations. In this case, by continuing the learning of the repeatability of the driving assistance in the assistance target area 41, there is a possibility of a result in which the current "spot-specific operation information" has "repeatability." Accordingly, the continuation of learning is meaningful.

An unrealistic value is as follows: the successive number of times which is required is "fourteen times" when, for example, the foregoing number of estimations is six and the number of assistance successes is two. In this case, it is impossible to reach "80%" by continuing the foregoing learning until a percentage "assistance success" reaches "80%" at the twentieth time, far greater than ten times, which is the minimum number of estimations. It would be unrealistic to require at least fourteen further consecutive "assistance successes." In this case, there is almost no possibility of a result in which "spot-specific operation information" in the assistance target area 41 has "repeatability." Therefore, a determination can be made that the continuation of the provision of driving assistance information is meaningless. That is, a determination is made to stop the provision of driving assistance information in this assistance target area 41.

Figures 12, 13A, 13B, 13C:
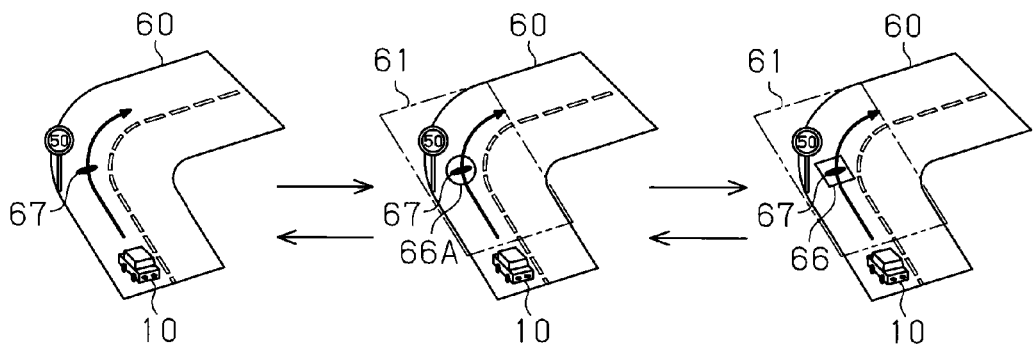
FIG. 12 is a graph illustrating the continuation determining process for driving assistance shown in FIG. 7.

A realistic value as the successive number of "assistance successes" required to make the current rate of "assistance success" equal to "80%" or greater is determined based on the list 74 shown in FIG. 12, which shows "the successive numbers of assistance successes" formed based on the list 73 in FIG. 11.

FIG. 11 shows the generation patterns of "assistance success", in which the rate of "assistance success" reaches "80%" when the number of estimations is ten times. In the list 73 in FIG. 11, forty-five combinations, in which the rate of "assistance success" equals "80%," are shown as patterns "1" to "45." In the list 73, "assistance success" is indicated by "○" and "assistance failure" is indicated by "x." In addition, the successive number of "assistance successes," that is, the successive number of "○" symbols indicates the successive number of assistance successes. Information and learning before a first time are not used for determination.

As shown in FIG. 11, forty-five patterns in which the rate of "assistant success" equals "80%" include a case where "assistance successes" occur consecutively. That is, if operation information given ten times results in an "assistance success" of eight times and an "assistance failure" of only two times, the maximum successive number of "assistance successes" is one selected from the range of a maximum of eight times (patterns "1," "9," and "45") to a minimum of three times (patterns "21," "27," and "28").

Specifically, in the patterns "1" to "9," the first "assistance failure" occurs at the first time, and the second "assistance failure" occurs at the second time in the pattern "1" and, in the successive patterns, it occurs at one time after that in the previous pattern. In the patterns "10" to "17," the first "assistance failure" occurs at the second time, and the second "assistance failure" occurs at the third time in the pattern "10" and, in the successive patterns, it occurs at one time after that in the previous pattern. In the patterns "18" to "24," the first "assistance failure" occurs at the third time, and the second "assistance failure" occurs at the fourth time in the pattern "18", and, in the successive patterns, it occurs at one time after that in the previous pattern. In the patterns "25" to "30," the first "assistance failure" occurs at the fourth time, and the second "assistance failure" occurs at the fifth time in the pattern "25" and, in the successive patterns, it occurs at one time after that in the previous pattern. In the patterns "31" to "35," the first "assistance failure" occurs at the fifth time, and the second "assistance failure" occurs at the sixth time in the pattern "31" and, in the successive patterns, it occurs at one time after that in the previous pattern. In the patterns "36" to "39," the first "assistance failure" occurs at the sixth time, and the second "assistance failure" occurs at the seventh time in the pattern "36" and, in the successive patterns, it occurs at one time after that in the previous pattern. In the patterns "40" to "42," the first "assistance failure" occurs at the seventh time, and the second "assistance failure" occurs at the eighth time in the pattern "40" and, in the successive patterns, it occurs at one time after that in the previous pattern. In the patterns "43" and "44," the first "assistance failure" occurs at the eighth time, and the second "assistance failure" occurs at the ninth time in the pattern "43" and, in the pattern 44, it occurs at the tenth time. In the pattern "45," the first "assistance failure" occurs at the ninth time, and the second "assistance failure" occurs at the tenth time.

The successive numbers of "assistance successes" in forty-five patterns are analyzed as described below. As shown in the list 74 in FIG. 12, the numbers of the maximum successive numbers of "assistance successes" are as follows: there are three patterns of eight successive times, six patterns of seven successive times, nine patterns of six successive times, twelve patterns of five successive times, twelve patterns of four successive times, and three patterns of three successive times. That is, the maximum successive number of "assistance successes" is eight, the most frequent successive numbers of "assistance successes" are five and four, and the minimum successive number of assistances is three. The ratio of the three patterns of eight successive times to the forty-five patterns is "3/45; "the thirty patterns of five successive times, "30/45 (3+6+9+12=30 patterns); and forty-five patterns of three successive times, "45/45" (3+6++9+12+12+3=45 patterns). Incidentally, combinations satisfying "80%/ten times" or higher do not include combinations of which the successive number of times is fewer than three times.

In the present embodiment, with regard to learning the repeatability of "spot-specific operation information," an estimation of "a case where, when the number of estimations has reached ten times, the rate of "assistance success" is estimated to be "80%" or more" is made based on the maximum successive number of "assistance successes" included in the most recent ten estimations. At this time, the probability that the rate of "assistance success" reaches "80%" or more tends to decrease as the maximum successive number decreases. The probability is highest when the maximum successive number is eight times and is lowest when it is three. The probability is higher when the maximum successive number is four times than when the maximum successive number is three times. The number of patterns included in the maximum successive number is smallest (3/45) when the successive number is eight times and is largest (45/45=100%) when the successive number is three times. When the maximum successive number is four times, the number of the patterns included in the maximum successive number is relatively large (42/45≈93%). Taking those into account, the maximum successive number appropriate for estimation is selected.

In the present embodiment, as "the identical determination successive number of times" for repeatability determination, one of successive numbers from eight times to three times, which have been described above, is set. In the "the identical determination successive number of times" for repeatability determination," the successive number (N2) for priority determination" is set as a value equal to or greater than "the normal determination," making it equally or more difficult to obtain the determination of "no repeatability." For example, in the present embodiment, "the successive number (N2) for priority determination" is set as eight times (the maximum successive number of times), and "the successive number (N1) for normal determination" is set as five times (the most frequent successive number of times). In the present embodiment, in a case where the number of the most frequent successive numbers of times is two or more, the average of these (rounded-up to the nearest whole number) is set as "the successive number (N1) for normal determination."

For example, based on the list 74, the realistic identical determination successive number for "normal determination" can be set as five times (the most frequent successive number of times) or the realistic identical determination successive number for "priority determination" can be set as eight times (the maximum successive number of times). Consequently, in a case where the successive number for "assistance success" which is required to make the current rate of "assistance success" equal to "80%" in the list 74 in FIG. 12 is greater than five or eight times, the operation information learning section 33 can determine to stop learning for the assistance target area 41. According to the list 74, it is not suitable to select, as a realistic identical determination successive number, a value greater than eight or smaller than three.

For example, it is assumed that, when "the number of estimations" is less than ten times, a percentage of "80%" is used to determine the presence or absence of repeatability. In this situation, the rate of "assistance success" may become less than "80%" as a result of adding and registering "assistance failure" after the determination is made that "assistance success" has repeatability. As a result, while "the number of estimations" is fewer than ten times, the determination result may change such that "spot-specific operation information" has no repeatability, which may not be satisfactory as a determination result.

In the present embodiment, when "the number of estimations" is fewer than ten times, the successive number is used for the presence or absence of repeatability. Consequently, even if "assistance failure" is added and registered after a determination is made that "assistance success" has repeatability, the successive number of "assistance successes" does not change. Therefore, the determination result of the repeatability of "spot-specific operation information" is prevented from changing to "no repeatability" while "the number of estimations" is fewer than ten times. Accordingly, a determination result can be maintained satisfactorily.

(Operation)

Next, the operation of a vehicular information-processing device according to the present embodiment will be described with reference to FIG. 13. Using an example where a vehicle 10 passes along a curved road 60, a description will be given of driving assistance provided for this curved road 60. FIG. 13(a) shows a state in which a "learning area" is not set because the vehicle 10 passes along the road 60 for the first time, for example. FIG. 13(b) shows a state in which "learning now" for the "learning area" is being carried out but driving assistance is not being carried out. FIG. 13(c) shows a state in which repeatability determination for driving assistance is being carried out as well as driving assistance for the "learning area."

Upon execution of a "deceleration operation" in a vehicle 10 running at a constant speed, the information-processing ECU 11 detects the executed "deceleration operation" and an "operation position 67" at the time. Also, the ECU 11 detects from a database 12A a "learning area" that includes the "operation position 67."

At this time, if the position is a spot through which the vehicle 10 passes for the first time, as shown in FIG. 13(a), a "learning area" is not retrieved. Therefore, the information-processing ECU 11 sets a new "learning area 61" that includes the "operation position 67," as shown in FIG. 13(b). Also, the information-processing ECU 11 registers the "learning area 61" and a "deceleration operation" in the database 12A, while correlating them with each other.

If the position is a spot through which the vehicle has previously passed, as shown in FIG. 13(b), the information-processing ECU 11 registers the "deceleration operation," which is "the latest operation information," while correlating this with "the learning area 61" obtained by retrieval. At this time, in the information-processing ECU 11, the repeatability of the "deceleration operation" is learned through "new learning." If a determination is made that the "deceleration operation" has "repeatability," the "deceleration operation" is set at the "learning area 61" as "spot-specific operation information." Consequently, as shown in FIG. 13(c), the "learning area 61" is established as an assistance target area, and the "spot-specific operation information" corresponding to the "learning area 61" is provided for the vehicle 10 as driving assistance information.

As shown in FIG. 13(c), after driving assistance is initiated in the "learning area," the information-processing ECU 11 learns repeatability for the "spot-specific operation information" in this "learning area 61." If, as a result of learning it, a determination is made that "repeatability is present," the ECU 11 continues driving assistance. If a determination is made that "repeatability is absent," the ECU 11 stops driving assistance and starts learning again (re-learning).

Specifically, if the deceleration operation of the vehicle 10 is performed having, as a target, a spot in an acceptable range 66 that includes the target position 67, a determination is made that the driving assistance has succeeded. Then, the determination of the successful driving assistance is registered and used for the information process ECU 11 to learn repeatability. In contrast, if the deceleration operation of the vehicle 10 is not performed having, as a target, a spot in the acceptable range 66 that includes the target position 67, a determination is made that the driving assistance has failed.

Additionally, if the number of driving assistances is equal to or greater than the minimum number of times (for example, ten times) that is required for repeatability determination of probability, the information-processing ECU 11 determines repeatability based on whether the success rate of driving assistance per ten latest estimations is equal to 80% or greater. That is, if the success rate of driving assistance is equal to or greater than "80%," a determination that "repeatability is present" is made. If the success rate of driving assistance is less than "80%," a determination that "repeatability is absent" is made. In the present embodiment, even if the number of times that the vehicle 10 has passed through the "learning area 61" is large, the information-processing ECU 11 makes a learning stop determination by using the latest ten items of operation information. Accordingly, if driving assistance in the "learning area 61" fails and the failure occurs only "a predetermined successive number," the information-processing ECU 11 is capable of making a determination in an early stage that "repeatability is absent," regardless of the number of times the vehicle has previously passed through the "learning area 61."

In contrast, if the number of driving assistances is fewer than the minimum number of times (for example, ten times) required for repeatability determination using probability, the information-processing ECU 11 determines the driving assistance usability based on the successive number of failures in driving assistance. For example, as normal determination, it is assumed that the realistic number of times (N1) that the driving assistance will be continued is five times. In this case, as shown in the graph 72 in FIG. 10, if the number of estimations is four times and the number of assistance successes is three times or more, a determination is made that "repeatability is present." If the number of assistance successes is two or fewer times, a determination is made that "repeatability is absent."

In a case where it is known in advance that the curved road 60 requires deceleration, that is, the road 60 has been set as a "deceleration target area," driving assistance repeatability is determined based on the "deceleration target area." For example, it is assumed that the realistic number of times (N2) that the driving assistance will be continued as a priority determination due to the "deceleration target area" is eight times, which is greater than N1. In this case, as shown in the graph 72 in FIG. 10, if the number of estimations is four times and the number of assistance successes is two times or more, a determination is made that "repeatability is present." If the number of assistance successes is one or fewer times, a determination is made that "repeatability is absent."

By using the successive number for repeatability determination in such a manner, an appropriate repeatability determination can be made even when the number of passages through the "learning area 61" is small. Therefore, it makes it possible to shorten the period of time that driving assistance information does not conform to a driver's vehicle operation.

By virtue of the determinations described above, if a determination is made that driving assistance based on "spot-specific operation information" has "no repeatability," the learning mode of vehicle driving assistance shifts to the mode shown in FIG. 13(*b*). If "spot-specific operation information" is set for the "learning area 61" as a result of learning shown in FIG. 13(*b*), the learning mode shifts to the mode shown in FIG. 13(*c*). In contrast, if "repeatability is absent" is determined in repeatability determination shown in FIG. 13(*c*), the learning mode shifts to "learning now" shown in FIG. 13(*b*). If a determination is made that learning is meaningless, as a result of learning shown in FIG. 13(*b*), the "learning area 61" is disregarded, and the learning mode shifts to a mode such that the "learning area 61" can be newly learned, as shown in FIG. 13(*a*), when the vehicle passes through this area next time.

As described above, the vehicular information-processing device and vehicular information-processing method according to the present embodiment have the advantages listed below.

(1) Based on the number of times that specific operation information provided as driving assistance information conforms to or does not conform to a vehicle operation that a driver is performing, an information-processing ECU 11 learns the driver's taste in driving, that is, repeatability. Since the information-processing ECU 11 learns repeatability based on the number of times that a determination is made, repeatability determination can be made fairly easy. That is, driver's operation information can be correlated with the learning result for repeatability more smoothly.

Additionally, for example, the number of determinations counted from the beginning point of learning increases only and never decreases until a minimum number of times (for example, ten times). Therefore, a stable determination result can be expected. As a result, driver's operation information can be more smoothly correlated with a learning result.

(2) Whether spot-specific operation information conforms to a driver's vehicle operation or not is determined based on whether the difference between the spot-specific operation information (e.g., stop position), provided in driving assistance information, and the result (e.g., actual stop position) of a driver's vehicle operation falls within an acceptable error ("individual person acceptable error"). Accordingly, by appropriately setting an acceptable error ("individual person acceptable error"), driving assistance can be provided without discomforting the driver.

(3) Movement of the vehicle 10 is regarded as the result of a driver's vehicle operation. Accordingly, based on movement of the vehicle, which is a driver's vehicle operation, whether driving assistance information is appropriate for the driver's vehicle operation or not can be determined. For example, in a determination whether driving assistance information is appropriate based on a pedal operation among a driver's vehicle operations, there is a possibility that, even though the movement of the vehicle is suitable, the driving assistance operation does not conform if there is no driver's pedal operation used as a reference for a determination of conforming. To solve the foregoing problem, the device determines, based on the movement of the vehicle, whether driving assistance information is appropriate or not. Thereby, even if the driver's pedal operation is not detected by a sensor or the like, whether the driving assistance information conforms or not can be appropriately determined. Thus, repeatability of vehicle operation relating to spot-specific operation information can be appropriately determined.

(4) An "individual person acceptable error" is set for each driver. Therefore, acceptable error can be used to reflect vehicle operation differences between drivers. By virtue of this, a driver can be provided with driving assistance information based on "individual person acceptable error" corresponding to that driver. Accordingly, any risk of discomforting the driver due to the driving assistance information decreases.

(5) Since repeatability of a deceleration operation is determined based on the successive number of times such as five or eight times, the influence of superfluous long-past passage operation history on the determination of the successive number of times is eliminated or reduced. Accordingly, change in the driver's taste in driving can be recognized at an early stage.

(6) In a case where the same type of vehicle operation as a vehicle operation required in a location where a particular vehicle operation is required, a "deceleration target area," namely, a "deceleration operation" is learned, the successive number of times used to learn the repeatability of the operation information is changed. For example, in a location where a temporary stop is required, a driver is requested to perform a deceleration operation, which is a particular vehicle movement. Accordingly, the number of times that the same type of determination used for learning the repeatability of a deceleration operation can be reduced.

(7) Since a spot, that is, a "learning area" is set based on operation information, the flexibility of setting a spot in which driving assistance is learned can be improved. Additionally, a spot (i.e., a learning area) in which such learning is carried out is set as a spot of a predetermined range that includes a spot in which operation information is obtained. Accordingly, it becomes possible to suitably cope with, for example, vehicle displacement due to road conditions or displacement due to a degree of inaccuracy in position detection. Also, a predetermined range is used as the identical spot. Therefore, many spots where repeatability is learned (i.e., learning areas) are prevented from being set over a range in which they are close to one another. Accordingly, information increase can also be restricted.

(Other Embodiments)

The embodiment described above may also be carried out in the manner described below.

In the embodiment described above, a "deceleration target area" has been set. However, the embodiment is not limited thereto and other target areas may be set. For example, an "acceleration target area" may be set, in which case, an "acceleration target area" and "acceleration operation" may be used in place of a "deceleration target area" and a "deceleration operation" respectively. Accordingly, the flexibility in design of a vehicular information-processing device is improved.

In the embodiment described above, whether there is a "deceleration target area" or not is determined. However, the embodiment is not limited thereto and whether there is a "deceleration target area" or not does not necessary need to be determined. In this case, any "learning area" can be, for example, learned for repeatability according to "normal determination." Accordingly, the flexibility in design of a vehicular information-processing device is improved.

In the embodiment described above, a "deceleration target area" is registered in the database 12A. However, the embodiment is not limited thereto and a deceleration area may be obtained from, for example, road data included in map information stored in a navigation system or road data transmitted from an external infrastructure device. This reduces time and effort required to register "deceleration target areas" in a database in advance and to keep them updated. Furthermore, even a spot that is not included in a database can also be set as a "deceleration target area." Accordingly, the vehicular information-processing device becomes more user-friendly.

In the embodiment above, a description is given of a case where the "learning area" and the assistance target area 41 are set in the same range. However, the embodiment is not limited thereto and "learning area" and assistance target area may differ in range. That is, the range of "learning area" used for "new learning" or "continuous learning" and an assistance target area in which driving assistance is carried out do not have to coincide and may differ. Thus, the flexibility in setting "learning areas" and assistance target areas, and the flexibility in the design of the vehicular information-processing device, are improved.

In the embodiment described above, the repeatability of "spot-specific operation information" in the assistance target area 41 is determined by the information-processing ECU 11 of the vehicle 10. However, the embodiment is not limited thereto and the repeatability of "spot-specific operation information" in the assistance target area 41 may be determined by an information processing center provided outside a vehicle. If the vehicle and the information processing center are configured to be able to communicate with each other, the repeatability of "spot-specific operation information" can be determined by the information processing center. By determining the repeatability of "spot-specific operation information" with respect to assistance target area 41 in such a manner, the flexibility in system configuration of the vehicular information-processing system is improved.

In the embodiment described above, whether "spot-specific operation information" conforms to a driver's vehicle operation is determined based on the deviation of the "actual stop position" of the vehicle 10 from the "stop target position 40a." However, the embodiment is not limited thereto and the foregoing determination can be made based on, for example, the difference between the "timing of Accelerator OFF" and the "actual timing of Accelerator OFF" if the difference is between the driving assistance provided and actual movement of the vehicle. Accordingly, the flexibility in design or the applicability of the vehicular information-processing device can be improved, such as by making it possible to make determinations for various drive operations.

In the embodiment described above, driving assistance is provided for a driver's "deceleration operation" (stopping operation may be included). However, the embodiment is not limited thereto and driving assistance may be provided for a driver's "acceleration operation," "steering operation," or the like. Even for "acceleration operation" or "steering operation," a driving assistance signal for these operations can be output by selecting "acceleration operation" or "steering operation" as "assistance operation" in a "learning area." Accordingly, by executing control corresponding to each driving assistance signal obtained by an engine ECU, a steering ECU, or a braking ECU, driving assistance can be provided for the driving assistance signal.

In the embodiment described above, past "operation information" that has reached the upper limit number (ten) is deleted. However, the embodiment is not limited thereto and past "operation information" that has exceeded the upper limit number does not necessarily need to be deleted. Accordingly, for example, even in a situation where the number of items of "operation information" is changed to a larger value, the embodiment is able to cope with the change.

In the embodiment described above, the maximum number of items of "operation information" that the operation information learning section 33 uses is only the latest ten items of operation information. However, the embodiment is not limited thereto and the upper limit number of items of "operation information" used for learning may be fewer or greater than ten.

In the embodiment described above, "learning based on a rate" is not used when the number of items of operation information is fewer than ten. However, the embodiment is not limited thereto and "learning based on a rate" may be carried out when the number of items of operation information is fewer than ten. In this case, the number of times of operation information for "learning based on the successive number" may be adjusted to a value convenient to carry out "learning based on a rate." Thus, the flexibility in the design of a vehicular information-processing device is improved.

In the embodiment described above, the number of items of operation information for learning repeatability is less than ten. However, the embodiment is not limited thereto and learning of repeatability may be carried out when the number of items of operation information is ten or more. Thus, the flexibility in the design of a vehicular information-processing device is improved.

In the embodiment described above, new learning and continuous learning are carried out. However, the embodiment is not limited thereto and continuous learning may only be carried out based on the result of new learning. Thus, the flexibility in the design of a vehicular information-processing device is improved.

DESCRIPTION OF THE REFERENCE NUMERALS

10 VEHICLE
11 INFORMATION-PROCESSING ECU (INFORMATION-PROCESSING ELECTRONIC CONTROL UNIT)
12 AUXILIARY STORAGE DEVICE
12A DATABASE
13 ENGINE ECU (ENGINE ELECTRONIC CONTROL UNIT)
14 STEERING ECU (STEERING ELECTRONIC CONTROL UNIT)
15 BRAKING ECU (BRAKING ELECTRONIC CONTROL UNIT)
16 SPEAKER
17 MONITOR
20 SPEED SENSOR
21 GPS
22 ACCELERATOR PEDAL SENSOR
23 BRAKE PEDAL SENSOR
31 OPERATION INFORMATION EXTRACTING PART
32 POSITION INFORMATION-PROCESSING SECTION
33 OPERATION INFORMATION LEARNING SECTION
34 ASSISTANCE INFORMATION OUTPUT SECTION
40 ROAD
40a STOP TARGET POSITION
41 ASSISTANCE TARGET AREA
41a BEGINNING POINT
41b END POINT
42 GRAPH
42A SPEED CHANGE
43 PEDAL OPERATION LIST 43a to 43h OPERATION
44A ACCELERATION OPERATION
44B DECELERATION OPERATION
44C ACCELERATION OPERATION
45A BEFORE APPROACH
45B DURING APPROACH
45C AFTER APPROACH
46 STANDARD ACCEPTABLE ERROR
47 INDIVIDUAL PERSON ACCEPTABLE ERROR
50 ROAD
50A STOP TARGET POSITION
51 ASSISTANCE TARGET AREA
52A SPEED CHANGE
56 STANDARD ACCEPTABLE ERROR
57 INDIVIDUAL PERSON ACCEPTABLE ERROR
60 CURVED ROAD
66 ACCEPTABLE RANGE
67 TARGET POSITION
71, 72 GRAPH
73, 74 LIST

The invention claimed is

1. A vehicular information-processing device comprising:
an operation information learning section circuit that is configured to learn operation information, which is obtained according to various driver's vehicle operations, to correlate the operation information with spots at which the corresponding vehicle operations have been performed, and
an assistance information output section circuit that is configured to provide, as driving assistance information, the operation information specific to the spot based on a result of the learning,
the operation information learning section circuit being configured to perform:
determining whether the operation information specific to the spot provided at a single spot conforms to the driver's vehicle operation at the spot or not, and
learning repeatability of the operation information specific to the spot provided at the spot based on the number of times that a determination is made that there is conformity or the number of times that a determination is made that there is no conformity, wherein
the operation information learning section circuit is configured to learn the number of times that the same type of determination is made consecutively, as the number of times that a determination is made that there is conformity or the number of times that a determination is made that there is no conformity is, and wherein
the operation information learning section circuit is configured to change the number of times that the same t s e of determination is made if the spot is a location where the particular vehicle operation is requested, consecutively.

2. The vehicular information-processing device according to claim 1, wherein the operation information learning section circuit is configured to make the determination whether or not there is conformity based on whether a difference between the operation information specific to the spot provided in the driving assisting information and the result of the driver's vehicle operation falls within an acceptable error range or not.

3. The vehicular information-processing device according to claim 2, wherein the operation information learning section circuit is configured to obtain the result of the vehicle operation as a movement result of the vehicle.

4. The vehicular information-processing device according to claim 2 wherein the operation information learning section circuit is configured to set the acceptable error for each driver.

5. The vehicular information-processing device according to claim 1, wherein the operation information learning section circuit is configured to set the spot as a spot defined by a predetermined range that includes the spot when the operation information was obtained at the spot for the first time.

6. A vehicular information-processing method performed by a vehicular information-processing device including an operation information learning section circuit and an assistance information output section circuit, comprising:
learning operation information by the operation information learning section circuit, which information is obtained according to various driver's vehicle operations, to correlate the operation information with spots at which the corresponding vehicle operations have been performed;
providing by the assistance information output section circuit, as driving assistance information, the operation information specific to the spot based on a result of the learning;
determining by the operation information learning section circuit whether the operation information specific to the spot provided at a single spot conforms to the driver's vehicle operation at the spot or not;
learning by the operation information learning section circuit repeatability of the operation information specific to the spot provided at the spot based on the number of times that a determination is made that there is conformity or the number of times that a determination is made that there is no conformity;
using by the operation information learning section circuit the number of times that the same type of determination is made consecutively, as the number of times that a determination is made that there is conformity or the number of times that a determination is made that there is no conformity; and
changing by the operation information learning section circuit the number of times that the same type of determination is made consecutively when the spot is a location where the particular vehicle operation is requested.

7. The vehicular information-processing method according to claim 6, wherein the determining includes determining by the operation information learning section circuit whether or not there is conformity based on whether a difference between the operation information specific to the spot provided in the driving assisting information and the result of the driver' vehicle operation falls within an acceptable error range or not.

8. The vehicular information-processing method according to claim 7, further comprising using by the operation information learning section circuit a movement result of the vehicle as the result of the vehicle operation.

9. The vehicular information-processing method according to claim 7, further comprising setting by the operation information learning section circuit the acceptable error for each driver.

10. The vehicular information-processing method according to claim 6, further comprising setting by the operation information learning section circuit, prior to the determining, the spot as a spot defined by a predetermined range that includes the spot when the operation information was obtained at this spot for the first time.

* * * * *